United States Patent
Degner et al.

(10) Patent No.: US 10,983,650 B2
(45) Date of Patent: Apr. 20, 2021

(54) DYNAMIC INPUT SURFACE FOR ELECTRONIC DEVICES

(71) Applicant: Apple Inc., Cupertino, CA (US)

(72) Inventors: Brett W. Degner, Menlo Park, CA (US); Daniel D. Sunshine, Sunnyvale, CA (US); Ron A. Hopkinson, Campbell, CA (US); Christiaan A. Ligtenberg, San Carlos, CA (US); William F. Leggett, San Jose, CA (US); Patrick Kessler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/863,647

(22) Filed: Apr. 30, 2020

(65) Prior Publication Data

US 2020/0257375 A1  Aug. 13, 2020

Related U.S. Application Data

(63) Continuation of application No. 14/867,376, filed on Sep. 28, 2015, now Pat. No. 10,656,719.

(Continued)

(51) Int. Cl.
*G06F 3/0354* (2013.01)
*G06F 3/044* (2006.01)
(Continued)

(52) U.S. Cl.
CPC ............ *G06F 3/0447* (2019.05); *G06F 1/169* (2013.01); *G06F 1/1662* (2013.01); *G06F 3/016* (2013.01);
(Continued)

(58) Field of Classification Search
CPC ........ G06F 3/017; G06F 1/1662; G06F 1/169; G06F 3/03547; G06F 3/041; G06F 3/04886
See application file for complete search history.

(56) References Cited

U.S. PATENT DOCUMENTS

| 5,212,356 A | 5/1993 | English |
| 5,541,372 A | 7/1996 | Bailer |

(Continued)

FOREIGN PATENT DOCUMENTS

| CN | 1862732 | 11/2006 |
| CN | 101071354 | 11/2007 |

(Continued)

OTHER PUBLICATIONS

Rekimoto, Jun, "Thumbsense: Automatic Input Mode Sensing for Touch-Based Interactions," Interaction Laboratory, Sony Computer & Science Laboratories, Inc., 2 pages, Apr. 2003.

*Primary Examiner* — Nitin Patel
*Assistant Examiner* — Robert M Stone
(74) *Attorney, Agent, or Firm* — Brownstein Hyatt Farber Schreck, LLP

(57) ABSTRACT

A dynamic input surface for an electronic device and a method of reconfiguring the same is disclosed. The input surface has a partially-flexible metal contact portion defining an input area, and a group of indicators. The indicators may be group of holes extending through the contact portion. The group of holes may be selectively illuminated based on a gesture performed on the contact portion. A size of the input area may be dynamically varied based on the gesture. Additionally, the group of indicators indicates a boundary of the input area.

20 Claims, 15 Drawing Sheets

Related U.S. Application Data

(60) Provisional application No. 62/057,425, filed on Sep. 30, 2014, provisional application No. 62/057,350, filed on Sep. 30, 2014.

(51) Int. Cl.
*G06F 1/16* (2006.01)
*G06F 3/01* (2006.01)
*G06F 3/0488* (2013.01)
*G06F 3/041* (2006.01)
*G06F 3/02* (2006.01)

(52) U.S. Cl.
CPC ............ *G06F 3/017* (2013.01); *G06F 3/0213* (2013.01); *G06F 3/03547* (2013.01); *G06F 3/041* (2013.01); *G06F 3/0445* (2019.05); *G06F 3/04886* (2013.01); *G06F 2203/04102* (2013.01); *G06F 2203/04106* (2013.01)

(56) References Cited

U.S. PATENT DOCUMENTS

| | | |
|---|---|---|
| 5,748,177 A | 5/1998 | Baker et al. |
| 5,920,303 A | 7/1999 | Baker et al. |
| 6,029,214 A | 2/2000 | Dorfman et al. |
| 6,429,846 B2 | 8/2002 | Rosenberg et al. |
| 6,585,435 B2 | 7/2003 | Fang |
| 6,757,002 B1 | 6/2004 | Cross |
| 6,822,640 B2 | 11/2004 | Derocher |
| 7,339,577 B2 | 3/2008 | Sato |
| 7,364,337 B2 | 4/2008 | Park |
| 7,364,339 B2 | 4/2008 | Park |
| 7,538,760 B2 | 5/2009 | Hotelling |
| 7,683,890 B2 | 3/2010 | Geaghan |
| 7,834,855 B2 | 11/2010 | Hotelling et al. |
| 7,839,379 B1 | 11/2010 | Kerr |
| 7,843,438 B2 | 11/2010 | Onoda |
| 7,847,789 B2 | 12/2010 | Kolmykov-Zotov et al. |
| 7,884,315 B2 | 2/2011 | Andre et al. |
| 7,893,921 B2 | 2/2011 | Sato |
| 7,901,991 B2 | 3/2011 | Bonucci et al. |
| 7,999,792 B2* | 8/2011 | Tsuji ................... G06F 1/169 345/168 |
| 8,022,942 B2 | 9/2011 | Bathiche |
| 8,063,893 B2 | 11/2011 | Rosenberg et al. |
| 8,077,057 B2 | 12/2011 | Ohshita et al. |
| 8,098,233 B2 | 1/2012 | Hotelling et al. |
| 8,321,810 B2 | 11/2012 | Heintze |
| 8,330,725 B2* | 12/2012 | Mahowald ............ G06F 3/0202 345/170 |
| 8,334,794 B2 | 12/2012 | Watanabe |
| 8,335,996 B2 | 12/2012 | Davidson et al. |
| 8,378,975 B2 | 2/2013 | Yoon et al. |
| 8,381,118 B2 | 2/2013 | Minton |
| 8,390,481 B2 | 3/2013 | Pance et al. |
| 8,432,362 B2 | 4/2013 | Cheng et al. |
| 8,436,816 B2* | 5/2013 | Leung ................... F21V 11/14 345/173 |
| 8,441,790 B2* | 5/2013 | Pance ................... G06F 3/043 361/679.55 |
| 8,502,800 B1 | 8/2013 | Vier et al. |
| 8,537,132 B2 | 9/2013 | Ng et al. |
| 8,537,140 B2 | 9/2013 | Tsai et al. |
| 8,570,280 B2 | 10/2013 | Stewart et al. |
| 8,592,699 B2 | 11/2013 | Kessler |
| 8,599,141 B2 | 12/2013 | Soma |
| 8,642,908 B2 | 2/2014 | Moran et al. |
| 8,654,524 B2 | 2/2014 | Pance et al. |
| 8,686,952 B2 | 4/2014 | Burrough et al. |
| 8,723,824 B2 | 5/2014 | Myers |
| 8,743,083 B2 | 6/2014 | Zanone et al. |
| 8,749,523 B2* | 6/2014 | Pance ................... H03K 17/98 345/175 |
| 8,766,922 B2 | 7/2014 | Kim et al. |
| 8,782,556 B2 | 7/2014 | Badger et al. |
| 8,786,568 B2 | 7/2014 | Leung et al. |
| 8,804,347 B2 | 8/2014 | Martisauskas |
| 8,854,325 B2 | 10/2014 | Byrd et al. |
| 8,859,923 B2 | 10/2014 | Obata |
| 8,870,812 B2 | 10/2014 | Alberti et al. |
| 8,952,899 B2 | 2/2015 | Hotelling |
| 8,960,934 B2* | 2/2015 | Sung ..................... F25D 29/005 362/92 |
| 8,963,846 B2 | 2/2015 | Lii et al. |
| 9,019,207 B1 | 4/2015 | Hamburgen et al. |
| 9,019,710 B2* | 4/2015 | Jeziorek ............... H05K 3/0061 361/749 |
| 9,028,123 B2 | 5/2015 | Nichol et al. |
| 9,063,627 B2 | 6/2015 | Yairi et al. |
| 9,098,120 B2 | 8/2015 | Huh |
| 9,098,244 B2 | 8/2015 | Roskind |
| 9,104,282 B2 | 8/2015 | Ichikawa |
| 9,116,616 B2 | 8/2015 | Kyprianou et al. |
| 9,122,330 B2 | 9/2015 | Bau et al. |
| 9,195,354 B2 | 9/2015 | Bulea et al. |
| 9,201,105 B2 | 12/2015 | Lida et al. |
| 9,213,426 B2 | 12/2015 | Clifton et al. |
| 9,223,352 B2 | 12/2015 | Smith et al. |
| 9,244,490 B2 | 1/2016 | Park |
| 9,250,738 B2 | 2/2016 | Sharma |
| 9,304,599 B2 | 4/2016 | Walline |
| 9,317,140 B2 | 4/2016 | Rosenfeld |
| 9,367,146 B2 | 6/2016 | Piot et al. |
| 9,367,158 B2 | 6/2016 | Hotelling et al. |
| 9,400,579 B2 | 7/2016 | Leung et al. |
| 9,460,029 B2 | 10/2016 | Shaw et al. |
| 9,542,097 B2 | 1/2017 | Ganey et al. |
| 9,543,948 B2 | 1/2017 | Curtis et al. |
| 9,575,587 B2 | 2/2017 | O'Keeffe |
| 9,635,267 B2 | 4/2017 | Lee et al. |
| 9,640,347 B2 | 5/2017 | Kwan |
| 9,753,569 B2 | 9/2017 | Han et al. |
| 9,811,221 B2 | 11/2017 | Hayashi |
| 9,847,505 B2 | 12/2017 | Chida |
| 9,908,310 B2 | 3/2018 | Niu |
| 9,927,895 B2* | 3/2018 | Ligtenberg ............ G06F 3/0412 |
| 10,067,628 B2 | 9/2018 | Kuscher et al. |
| 10,098,198 B2 | 10/2018 | Huebner et al. |
| 10,114,485 B2 | 10/2018 | Su |
| 10,146,383 B2 | 12/2018 | Leung et al. |
| 10,198,110 B2 | 2/2019 | Suwald et al. |
| 10,241,255 B2 | 3/2019 | Zha |
| 10,254,853 B2 | 4/2019 | Silvanto et al. |
| 10,318,065 B2 | 6/2019 | Peterson et al. |
| 10,409,412 B1 | 9/2019 | Andre et al. |
| 2004/0104894 A1 | 6/2004 | Tsukada et al. |
| 2004/0257345 A1 | 12/2004 | Makanae et al. |
| 2006/0044259 A1* | 3/2006 | Hotelling ............ G06F 3/04883 345/156 |
| 2006/0109258 A1* | 5/2006 | Takisawa ............ G06F 3/04886 345/173 |
| 2006/0197753 A1 | 9/2006 | Hotelling |
| 2007/0076859 A1 | 4/2007 | Tzvetanov |
| 2008/0018611 A1 | 1/2008 | Serban et al. |
| 2008/0055259 A1 | 3/2008 | Plocher et al. |
| 2008/0084404 A1* | 4/2008 | Andre ................... G09F 13/06 345/204 |
| 2008/0100568 A1 | 5/2008 | Koch et al. |
| 2008/0150903 A1* | 6/2008 | Chuang ................. G06F 1/1677 345/173 |
| 2008/0272927 A1 | 11/2008 | Woolley et al. |
| 2009/0128495 A1 | 5/2009 | Kong |
| 2009/0225052 A1 | 9/2009 | Liu |
| 2009/0259967 A1* | 10/2009 | Davidson ............... G06F 3/0485 715/799 |
| 2009/0284465 A1 | 11/2009 | Oki |
| 2009/0322683 A1* | 12/2009 | Tsuji ................... G06F 1/169 345/168 |
| 2010/0033354 A1 | 2/2010 | Ejlersen |
| 2010/0103116 A1* | 4/2010 | Leung ................... G06F 3/0416 345/173 |
| 2010/0265183 A1 | 10/2010 | Mail et al. |

(56) References Cited

U.S. PATENT DOCUMENTS

| | | |
|---|---|---|
| 2010/0271315 A1 | 10/2010 | Bathiche |
| 2010/0283741 A1 | 11/2010 | Heintze et al. |
| 2011/0001706 A1 | 1/2011 | Sanford |
| 2011/0037624 A1* | 2/2011 | Pance .................. G06F 1/1626 341/33 |
| 2011/0038114 A1* | 2/2011 | Pance .................. G06F 1/1684 361/679.4 |
| 2011/0043227 A1* | 2/2011 | Pance .................. H03K 17/955 324/681 |
| 2011/0069021 A1 | 3/2011 | Hill |
| 2011/0100568 A1 | 5/2011 | Kao |
| 2012/0001852 A1 | 1/2012 | Ho et al. |
| 2012/0050646 A1 | 3/2012 | Huang |
| 2012/0068933 A1 | 3/2012 | Larsen |
| 2012/0206363 A1* | 8/2012 | Kyprianou .......... G06F 3/04886 345/168 |
| 2012/0212424 A1* | 8/2012 | Sharma ................ G06F 3/0416 345/173 |
| 2012/0212443 A1 | 8/2012 | Tomimori |
| 2013/0002534 A1 | 1/2013 | Braun et al. |
| 2013/0002573 A1* | 1/2013 | Baba .................. G06F 3/03547 345/173 |
| 2013/0021256 A1 | 1/2013 | Manzen |
| 2013/0215122 A1 | 8/2013 | McCollum |
| 2013/0329396 A1* | 12/2013 | Smith .................. G06F 1/1656 362/23.03 |
| 2013/0335329 A1 | 12/2013 | Freund |
| 2014/0015755 A1* | 1/2014 | Hao .................... G06F 3/04883 345/168 |
| 2014/0043289 A1 | 2/2014 | Stern et al. |
| 2014/0208262 A1* | 7/2014 | Huang ................. G06F 3/0481 715/800 |
| 2014/0317564 A1 | 10/2014 | Odell et al. |
| 2014/0347312 A1 | 11/2014 | Siska |
| 2014/0368455 A1 | 12/2014 | Croisonnier et al. |
| 2015/0123906 A1 | 5/2015 | Mehandjiysky et al. |
| 2015/0123907 A1* | 5/2015 | Aoki .................. G06F 3/04886 345/168 |
| 2015/0205417 A1 | 7/2015 | Yairi et al. |
| 2015/0223328 A1 | 8/2015 | Endoh et al. |
| 2015/0268730 A1* | 9/2015 | Walline ............... G06F 3/04845 345/168 |
| 2015/0293592 A1 | 10/2015 | Cheong et al. |
| 2015/0297145 A1* | 10/2015 | Luna .................... A61B 5/4866 600/301 |
| 2015/0309589 A1 | 10/2015 | Chang |
| 2016/0049266 A1 | 2/2016 | Stringer et al. |
| 2016/0098107 A1* | 4/2016 | Morrell ................ G06F 3/041 345/173 |
| 2016/0103496 A1* | 4/2016 | Degner ................. G06F 3/017 345/157 |
| 2016/0147440 A1 | 5/2016 | Leyon |
| 2016/0202778 A1* | 7/2016 | Su ....................... G06F 1/16 345/168 |
| 2016/0231856 A1 | 8/2016 | Suwald et al. |
| 2017/0090594 A1 | 3/2017 | Silvanto et al. |
| 2017/0090596 A1 | 3/2017 | Silvanto et al. |
| 2017/0090597 A1 | 3/2017 | Silvanto et al. |
| 2017/0090654 A1 | 3/2017 | Silvanto et al. |
| 2017/0249072 A1 | 8/2017 | Martin et al. |
| 2017/0315622 A1 | 11/2017 | Morrell et al. |
| 2018/0011548 A1 | 1/2018 | Garelli |
| 2018/0039351 A1 | 2/2018 | Zhu et al. |
| 2019/0025954 A1 | 1/2019 | Wang et al. |
| 2019/0073003 A1 | 3/2019 | Xu et al. |

FOREIGN PATENT DOCUMENTS

| | | |
|---|---|---|
| CN | 101482785 | 7/2009 |
| CN | 101609383 | 12/2009 |
| CN | 101644979 | 2/2010 |
| CN | 101675410 | 3/2010 |
| CN | 201563116 | 8/2010 |
| CN | 102171632 | 8/2011 |
| CN | 102200861 | 9/2011 |
| CN | 102844729 | 12/2012 |
| CN | 103164102 | 6/2013 |
| CN | 103176691 | 6/2013 |
| CN | 203260010 | 10/2013 |
| CN | 103384871 | 11/2013 |
| CN | 103455205 | 12/2013 |
| CN | 103577008 | 2/2014 |
| CN | 103914196 | 7/2014 |
| CN | 104423740 | 3/2015 |
| CN | 104834419 | 8/2015 |
| CN | 104915002 | 9/2015 |
| CN | 205038595 | 2/2016 |
| EP | 0189590 | 6/1986 |
| EP | 2305506 | 4/2011 |
| EP | 2664980 | 11/2013 |
| FR | 2980004 | 3/2013 |
| JP | 2001175415 | 6/2001 |
| TW | 200912612 | 3/2009 |
| TW | 201419112 | 5/2014 |
| WO | WO 07/032949 | 3/2007 |
| WO | WO 11/159519 | 12/2011 |
| WO | WO 14/124173 | 8/2014 |
| WO | WO 14/164628 | 10/2014 |

* cited by examiner

DYNAMIC INPUT SURFACE FOR ELECTRONIC DEVICES

CROSS-REFERENCE TO RELATED APPLICATIONS

This application is a continuation of U.S. Nonprovisional patent application Ser. No. 14/867,376, filed Sep. 28, 2015, and titled "Dynamic Input Surface for Electronic Devices," which is a nonprovisional patent application of and claims the benefit of U.S. Provisional Patent Application No. 62/057,425, filed Sep. 30, 2014, and titled "Dynamic Track Pad for Electronic Devices," and U.S. Provisional Patent Application No. 62/057,350, filed Sep. 30, 2014, and titled "Zero-Travel Input Structure," the contents of which are incorporated by reference as if fully disclosed herein.

FIELD

The disclosure relates generally to electronic devices, and more particularly to a dynamic input surface for an electronic device, and a method of reconfiguring the dynamic input surface.

BACKGROUND

Conventional electronic devices typically include a variety of distinct input devices or input surfaces formed from a variety of components. For example, conventional laptop computing devices typically include a keyboard and a track pad to allow a user to interact with the laptop. Each of these devices includes components that may be positioned both inside and outside of the casing of the laptop. For example, the keyboard may include keycaps protruding from the casing, and corresponding internal dome switches, electrical contacts and traces positioned within the casing. In order for the keycaps to protrude from the casing and maintain contact with the internal components, keycap apertures are formed through the casing of the electronic device.

Conventional input devices, such as keyboards or track pads for a laptop, are susceptible to damage. For example, debris and other contaminants may enter the casing of the electronic device through the keycap apertures and may subsequently damage the internal components of the electronic device. The damage to the internal components may render the electronic device inoperable. Likewise, the mechanical structures forming the input devices may be especially vulnerable to a drop or mechanical shock.

Additionally, because many conventional input devices have a number of components positioned both inside and outside the casing of the electronic device, the risk of component failure may increase. That is, in combination with some components being positioned on the outside of the casing where a number of components are used to form each of the conventional input devices, if a single component is damaged, lost, or becomes inoperable, the entire input device may become inoperable.

Furthermore, the construction or formation of conventional track pads may only enable the track pad to be static and/or fixed within an electronic device. That is, conventional track pads may have a fixed position within the electronic device. As a result, the track pad may not be positioned in a desired and/or optimal position during certain uses of the electronic device. Additionally, the conventional track pad may have a fixed dimension, which may be cumbersome when electronic device is being utilized to perform actions that involve a large amount of scrolling or other track pad functions.

SUMMARY

A dynamic input surface is disclosed. The dynamic input surface comprises a metal contact portion defining an input area, and a group of indicators selectively illuminated based on a gesture performed on the metal contact portion. A size of the input area dynamically varies based on the gesture, and the group of indicators indicates a boundary of the input area.

An electronic device comprising a metal casing is disclosed. The metal casing comprises a partially-flexible contact portion, a keyboard assembly positioned within the metal casing, and a dynamic input surface on the metal casing. The dynamic input surface comprises a group of indicators, and an adjustable input area bounded by an illuminated subset of the group of indicators.

A method for reconfiguring a dynamic input surface of an electronic device is disclosed. The method comprises illuminating a boundary of an input area of the dynamic input surface, where the input area comprises a part of a contact surface. The method also comprises receiving at least one gesture within or on the boundary of the input area, adjusting at least one of a position or a size of the input area of the dynamic input surface based on the gesture, and varying the illumination of the boundary accordingly.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
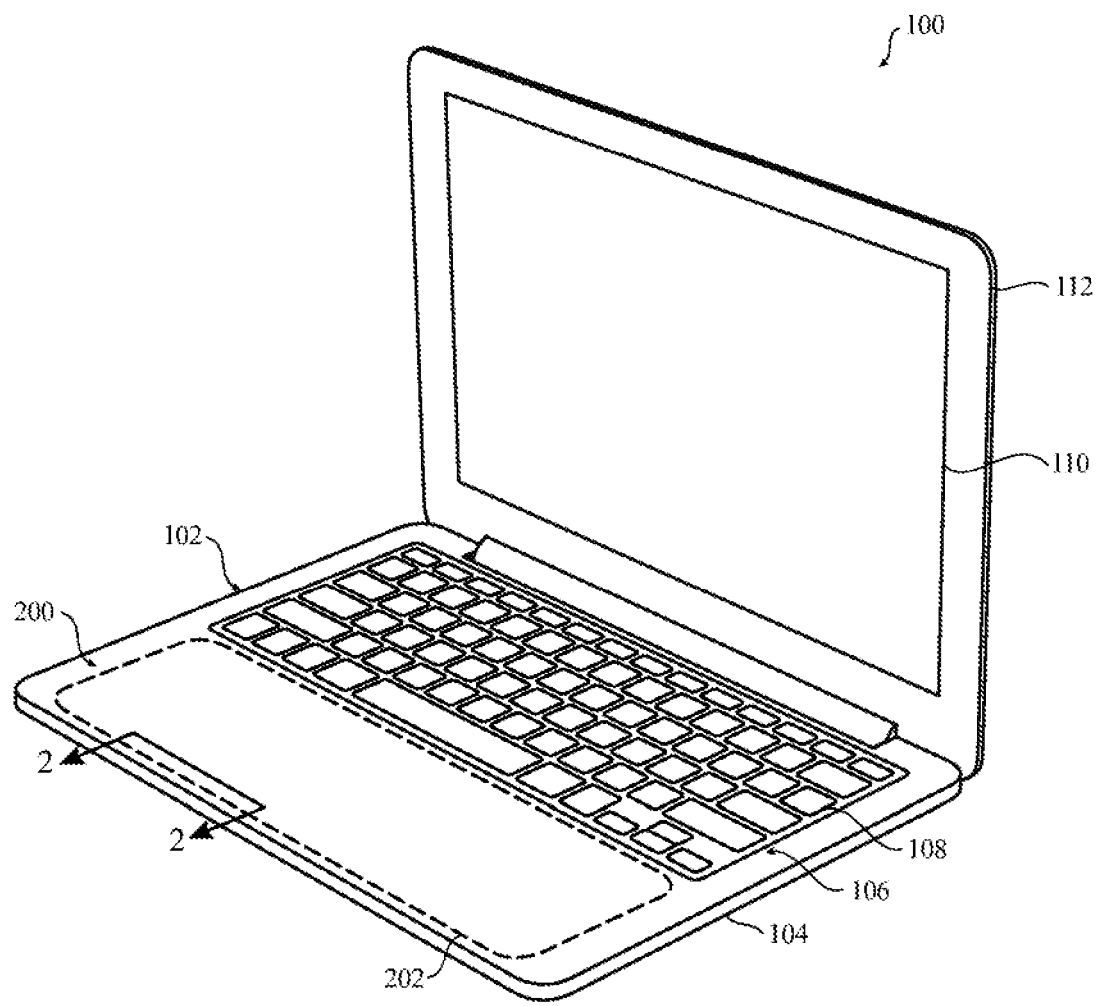
FIG. 1A shows an electronic device including a dynamic input surface, according to embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic devices, and more particularly to a dynamic input surface for electronic devices, and a method of reconfiguring the dynamic input surface.

In a particular embodiment, a dynamic input surface of an electronic device is configurable, such that the size, shape and/or positioning of the input surface can be changed and/or customizable. The size, shape and/or positioning of the input surface may be customized based on a user's desire and/or interaction within the electronic device. Increasing the size of the dynamic input surface allows a user more space for scrolling gestures, which may eliminate the need of a user having to lift their fingers from the input surface to continue scrolling. Additionally, changing the position or shape of the dynamic input surface allows a user to move dynamic input surface to a preferred side of the casing for easier or more comfortable use of the dynamic input surface and/or to move the dynamic input surface to a side when the dynamic input surface is not being utilized by a user interacting with the electronic device. The dynamic input surface may function as a track pad, for example, or other input device.

In another particular embodiment, the electronic device includes a contact portion formed from a flexible material that may bend or deform into and/or contact a portion of an input surface stack-up. The input surface stack-up may capacitively sense a user's touch or gesture, input force or deformation of the flexible material due to application of an a user's gesture or input force on a corresponding contact portion of the electronic device. The touch gestures and input force applied to the contact portion is of sufficient magnitude to result in deformation of the contact portion into the stack-up such that the stack-up capacitively senses the gesture and/or force, and also is a minimal magnitude so that the bending or deformation of the contact portion is visually and/or tactilely imperceptible to a user. It should be appreciated that the deformation may be on the order of tens of microns, for example 100 microns or less, 50 microns or less, or 10 microns or less, in certain embodiments. In other embodiments, the deformation or other travel of the contact portion may be greater and may be perceptible to a user.

When a detected touch, gesture, or input force changes a measured capacitance, an input corresponding to any or all of the location of the capacitance change, amount of capacitive change and/or deformation of the flexible material may be provided to the electronic device. The location of a capacitive change may correspond to a location on a surface of the electronic device at which the touch gesture or input force was provided, and thus to a touch location. Accordingly, embodiments herein may detect not only a continuum of forces (as opposed to binary detection of force) but also a location of touch/interaction. Further, because embodiments described herein do not rely on capacitive coupling between a sensor and a device or person providing a touch input, embodiments may sense force and/or touch through grounding and/or shielding structures, such as metal, and may sense inputs provided by non-capacitive constructs touching an electronic device. Typical input forces may be approximately 20-350 grams, in certain embodiments, although this range is meant merely as an example rather than a limitation.

The electronic device may also include holes formed or otherwise extending through the contact portion, which may be selectively lit by the input surface stack-up. The holes may be selectively lit when a user of the electronic device repositions and/or resizes the interactive or input area of the dynamic input surface formed on the contact portion. As a result, a user may reconfigure the input surface used to interact with the electronic device based on user preference and/or operational characteristics of the electronic device, as discussed herein. In some embodiments, indicators other than holes (or illuminated holes) may be activated or selected instead.

Additionally, and as discussed herein, certain embodiments of the dynamic input surface allows a user to view previous movements, gestures and/or finger positioning when interacting with the electronic device. That is, previously touched portions of the dynamic input surface are illuminated to form a visual path indicating where the user previously touched (or otherwise interacted with) the casing and/or the dynamic input surface of the electronic device. This may be especially helpful when the electronic device is used with drawing or illustrator programs and/or games, in which cursor movements performed on the dynamic input surface require precision and a replication of previous movements on the input surface.

Furthermore, and as discussed herein, the components or layers forming the dynamic input surface are substantially surrounded by and/or enclosed within the casing of the electronic device. As a result, no portion of the dynamic input surface is exposed and/or positioned between the external and internal portion of the casing forming the electronic device. As a result, the casing can be formed from a solid piece of material, and thus may prevent damage to the internal components of the electronic device and/or the components of the dynamic input surface.

These and other embodiments are discussed below with reference to FIGS. 1A-9. However, those skilled in the art will readily appreciate that the detailed description given herein with respect to these figures is for explanatory purposes only and should not be construed as limiting.

Figure 1B:
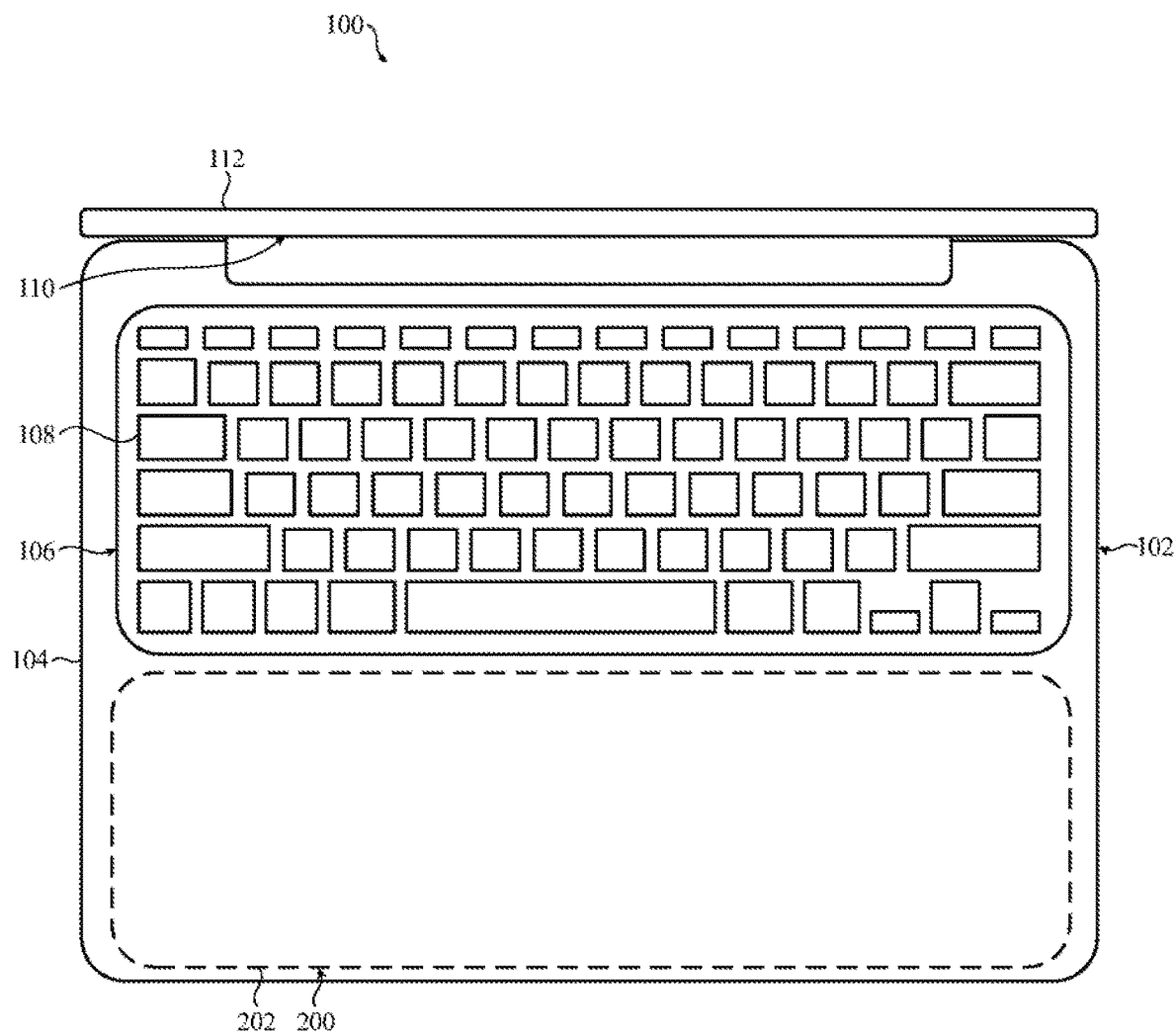
FIG. 1B shows a top view of the electronic device of FIG. 1A, according to embodiments.

FIGS. 1A and 1B show an electronic device 100, including a configurable, dynamic input surface 200, according to embodiments. In a non-limiting example, as shown in FIGS. 1A and 1B, electronic device 100 may be a laptop computer and the input surface may be a track pad. However, it is understood that electronic device 100 may be configured as any suitable electronic device that may utilize configurable, dynamic input surface 200 (hereafter, "input surface 200").

As discussed herein, dynamic input surface 200 is a configurable track pad or input device utilized by electronic device 100. As a configurable input surface, the size, shape and/or positioning of dynamic input surface 200 can be changed within the electronic device 100. Utilizing user gestures and an array of perforation holes formed in the casing of electronic device 100 to indicate boundary lines of the input surface, as discussed herein, dynamic input surface 200 can be customized based on a desired size, shape and/or position on the casing of electronic device 100. Increasing the size of dynamic input surface 200 may allow a user more space for scrolling gestures, which may eliminate the need of a user having to lift their fingers from the input surface to continue scrolling. Additionally, changing the position or shape of dynamic input surface 200 allows a user to move dynamic input surface 200 to a preferred side of the casing for easier or more comfortable use of dynamic input surface 200 and/or to move dynamic input surface 200 to a side when dynamic input surface 200 is not being utilized by a user interacting with electronic device 100.

Electronic device 100 may include a casing 102. Casing 102 may take the form of an exterior, protective casing or shell for electronic device 100 and the various internal components (for example, input surface 200) of electronic device 100. In a non-limiting example, as shown in FIGS. 1A and 1B, casing 102 may have a contact layer or portion 104. Contact layer (portion 104) may be formed as a single, integral component, or may have a number of distinct components that may be configured to be coupled to one another, as discussed herein. As discussed herein, contact portion 104 (including input surface 200) may be interacted with (e.g., touched) by a user for providing input and/or interacting with electronic device 100.

Contact portion 104 may be formed from any suitable material that provides a protective casing or shell for electronic device 100 and the various components included in electronic device 100. In a non-limiting example, contact portion 104 may be made from metal, such as an aluminum plate, housing (e.g., casing) or the like, that may be at least partially flexible when pressed by a user. In another non-limiting example, contact portion 104 may be formed from a ceramic, a plastic or another polymer, or a fiber-matrix composite, and so on.

Electronic device 100 may also include a keyboard assembly 106 including a group of keycaps 108. The keycaps 108 may at least partially protrude from contact portion 104, and each may be substantially surrounded by contact portion 104. In the non-limiting example shown in FIGS. 1A and 1B, where electronic device 100 is a laptop computer, keyboard assembly 106 may be positioned within and/or may be received by casing 102 of electronic device 100.

As shown in FIGS. 1A and 1B, electronic device 100 may also include a display 110 and a display case 112 housing display 110. Display case 112 may form an exterior housing and/or protective enclosure for display 110 of electronic device 100 as similarly discussed herein with respect to casing 102. Display 110 may be implemented as any suitable display technology utilized by electronic device 100.

Input surface 200 may be formed on and/or positioned on or within casing 102 of electronic device 100. As discussed herein, the various electrically communicative components or layers, commonly referred to as a "stack-up," forming input surface 200 may be positioned between and or secured to at least one of the contact portion 104 and/or a back portion of casing 102 of electronic device 100. Input surface 200 may provide space for or form an input area 202 (shown in phantom) on contact portion 104 of electronic device 100, as shown in FIGS. 1A and 1B. Input area 202 may be formed adjacent keyboard assembly 106. Additionally, in its widest form, as discussed herein, input area 202 may extend from keyboard assembly 106 to the edges of electronic device 100. The input area 202 is a predetermined area of contact portion 104 that may allow a user to interact and/or provide input to electronic device 100, as discussed herein.

As discussed in detail below, input area 202 on contact portion 104 may be formed from a stack-up as described below, where input area may be formed from a single stack-up or multiple stack-ups. In a non-limiting example, electronic device 100 may have a single stack-up for input area 202 on contact portion 104 of electronic device 100. In another non-limiting example, electronic device 100 may have multiple stack-ups for input area 202 on contact portion 104 of electronic device 100, where each stack-up is positioned proximate to another.

Although electronic device 100 is shown as a laptop computer, it is understood that electronic device 100 may be configured as any suitable electronic device that may utilize input surface 200. In non-limiting examples, other embodiments can implement electronic device 100 differently, such as, for example, a desktop computer, a tablet computing device, a smartphone, a gaming device, a display, a digital music player, a wearable computing device or display, a health monitoring device, and so on.

Additionally, although discussed herein in the context of a track pad, it is understood that the disclosed embodiments may be used in a variety of input devices used in various electronic devices. As discussed herein, input surface 200, and the components of the structure, may be utilized or implemented in a variety of input devices for an electronic device including, but not limited to: buttons, switches, toggles, wheels, mice, joystick, keyboards, and so on.

Figure 2:
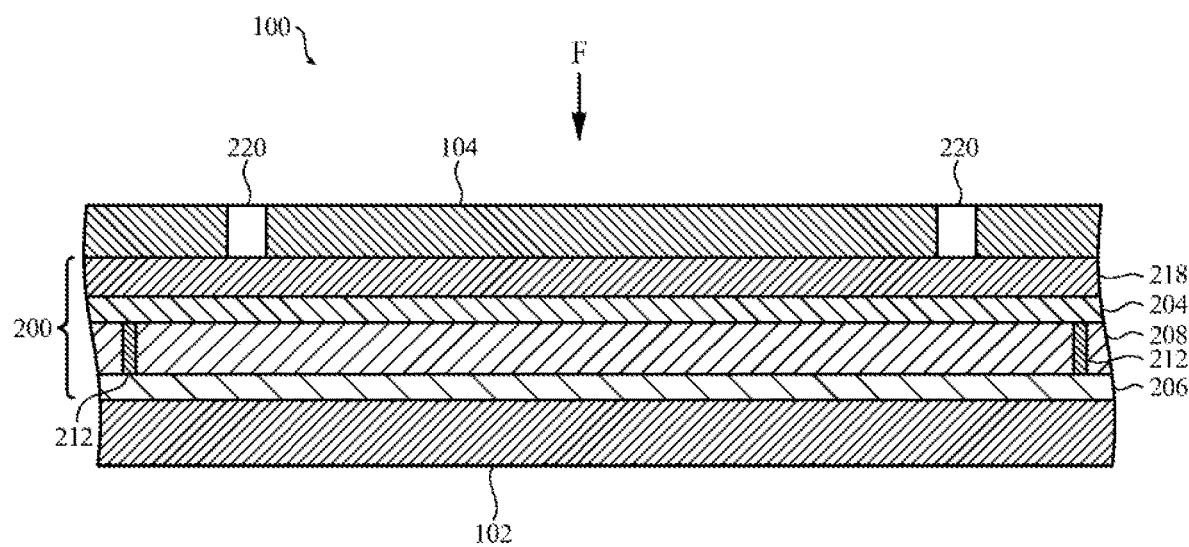
FIG. 2 shows a cross-section side view of a stack-up of the dynamic input surface of the electronic device of FIG. 1A, taken along line 2-2, according to embodiments. The dynamic input surface includes a compliant layer formed therein.
Figure 3:
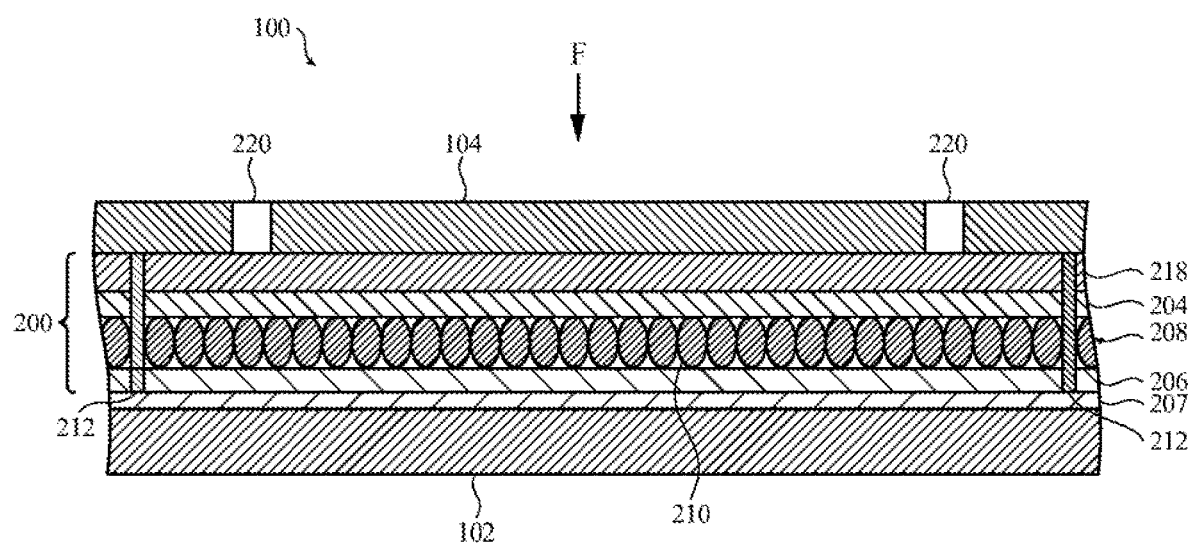
FIG. 3 shows a cross-section side view of a stack-up of the dynamic input surface of the electronic device of FIG. 1A, taken along line 2-2, according to embodiments. The dynamic input surface includes supports formed therein.

FIGS. 2 and 3 show a side cross-section view of a portion of electronic device 100, taken along line 2-2 in FIG. 1A. As shown in FIG. 2, and discussed herein, various electrically communicative components or layers (e.g., stack-up) forming input surface 200 may be positioned between contact portion 104 and a back portion of casing 102 for electronic device 100. The stack-up of input surface 200 may include a sense layer 204, and a corresponding drive layer 206 separated from sense layer 204. As shown in FIGS. 2 and 3, sense layer 204 may be positioned below contact portion 104, and drive layer 206 may positioned adjacent and/or above a back portion of casing 102 of electronic device 100. In a non-limiting example shown in FIG. 2, drive layer 206 may be positioned adjacent to and may contact the back portion of casing 102. In another non-limiting example shown in FIG. 3, drive layer 206 may be positioned adjacent the back portion of casing 102, but may be separated from casing 102 by a rigid base layer 207. In the non-limiting examples, back portion of casing 102 (FIG. 2) and rigid base layer 207 (FIG. 3) may be formed from metal, a ceramic, a plastic or another polymer, or a fiber-matrix composite that may be substantially rigid to support electronic device 100 and input surface 200. It should be appreciated that the position of sense layer 204 and/or drive layer 206 may be interchanged in certain embodiments. In a non-limiting example, sense layer 204 can be positioned above or adjacent base portion 106 and drive layer 206 can be positioned adjacent and/or beneath contact portion 104. Base portion 106 may serve as a ground and/or shield for drive layer 206 and/or sense layer 204, although this is not required.

Sense layer 204 and drive layer 206 of input surface 200 may cooperate to measure capacitance between the sense and drive layers, and particularly capacitances (and changes in capacitances) at specific areas where the sense layer 204 and drive layer 206 overlap. The capacitive characteristics of sense layer 204 and drive layer 206 may be utilized to detect a user's touch on contact portion 104 and/or deflection of contact portion 104 when a force (F) is applied by a user of electronic device 100. As discussed herein, user touch and the force (F) may be applied to contact portion 104 of electronic device 100 in an input area 202 for a user to provide input and/or to interact with electronic device 100. As result of the utilization of sense layer 204 and drive layer 206 in input structure 200 to determine input based on measured changes in capacitances, the touch, force, and/or contact applied to contact portion 104 can come from any user or object. That is, by measuring changes in capacitance, the input and/or interaction with electronic device 100 can be detected independent of the person or object providing the force. In a non-limiting example input structure 200 does not require the user to provide the touch or force with his finger or a capacitively-coupled object. Rather, the user can apply the touch or force to contact portion 104 using any object. For illustrative purposes, it is understood that a user's touch may be similarly represented as a force (F) and is visually interchangeable from the depicted force (F). As discussed herein, the distinction between a user's touch and a force (F) for deforming contact portion 104 is based on the magnitude of the touch and the force.

As shown in FIGS. 2 and 3, a compliant layer 208 may be positioned between sense layer 204 and drive layer 206 of stack-up of input surface 200. Compliant layer 208 may also be physically coupled to each or both of sense layer 204 and drive layer 206. Compliant layer 208 may be coupled to sense layer 204 and drive layer 206 using any suitable adhesive.

Compliant layer 208 may be formed from a substantially flexible and elastic material to support sense layer 204, and/or prevent sense layer 204 from contacting drive layer 206 when a touch or force is applied to contact portion 104 of electronic device 100. Additionally, the elastic properties of compliant layer 208 may allow sense layer 204 to return to a neutral state (e.g., spring-back to an uncompressed position) relatively rapidly, thereby permitting the detection of a consecutively-applied touches or forces being applied at or near the same position on contact portion 104 and/or input area 202. Compliant layer 208 can have apertures formed therein or can be a set of structures such as columns or pillars, in order to provide space for compliant layer 208 to expand when deformed by a force. Alternatively, compliant layer 208 can be solid, continuous layer(s) of material with no apertures, as discussed herein.

In a non-limiting example, and as shown in FIG. 2, compliant layer 208 may be formed from a single sheet of elastomeric material that may be disposed between sense layer 204 and drive layer 206. The elastomer forming compliant layer 208 may be any suitable material that may deform, and subsequently spring-back, as sense layer 204 (or a discrete portion thereof) is compressed toward drive layer 206 as a result of a touch or force (F) applied to, and subsequently removed from, contact portion 104. The elastomer may be a compliant gel, for example.

In another non-limiting example, as shown in FIG. 3, compliant layer 208 may be formed from a number of deformable components, such as deformable compliant structures 210. For convenience, the term "gel dots" is used herein to describe the compliant structures, but this term is not meant to limit the structures to any particular material or shape. Deformable gel dots 210 may be formed from similar material as discussed herein with respect to compliant layer 208 in FIG. 2, and may have any suitable shape, size or configuration; in certain embodiments, the dots are cylindrical and form pillar-like structures extending between the drive and sense layers. As such, deformable gel dots 210 may also include similar structurally supportive characteristics and/or elastic characteristics as compliant layer 208. The deformable gel dots 210 may be individual components that may be bonded, laminated or otherwise coupled to form a single layer of deformable gel dots 210. Although shown and discussed herein as gel dots, it is understood that the number of deformable components forming compliant layer 208 can be any shape, any material having distinct consistencies and/or viscosities, so long as the deformable components forming compliant layer 208 function in a substantially similar manner as gel dots 210 discussed herein.

The inclusion of the deformable gel dots 210 in the non-limiting example of FIG. 3 may aid in detecting the touch or force (F) applied to contact portion 104 of electronic device 100. In a non-limiting example, where compliant layer 208 includes deformable gel dots 210, the touch or force (F) may be more localized or focused on those gel dots 210 aligned with the touch or force (F) (e.g., under or nearby the portion of the contact portion 104 to which the force is applied). In the non-limiting example, gel dots 210 not under or otherwise aligned with the touch or force (F) may not be deformed. Additionally, the deformable gel dots 210 may not disperse or otherwise spread the touch or force (F) out over surrounding segments of the compliant layer 208. This may increase the accuracy and/or response-time of the touch or force (F) being applied to contact portion 104 of electronic device 100 by a user because only a select group of deformable gel dots 210 may experience the force (F) and deform as a result.

The stack-up may also have a set of supports 212 (e.g., one or more supports 212) positioned between contact portion 104 and casing 102 of electronic device 100. As shown in FIGS. 2 and 3, at least a portion of each of the supports 212 may be positioned within compliant layer 208. Additionally, the supports 212 may be distributed throughout contact portion 104 of electronic device 100 for providing structural support to contact portion 104. In a non-limiting example, the supports 212 may be positioned throughout electronic device 100 to provide structural support to contact portion 104 to substantially prevent or minimize undesirable bend in contact portion 104 when a force (F) is not applied by a user. Areas of contact portion 104 above and/or near supports 212 may be unbendable by a user, and therefore may be "dead zones" when no input can be detected by input surface 200. The set of supports 212 may be formed from any suitable material that may support contact portion 104. In a non-limiting example, the supports 212 may be formed from a polymer, such as plastic, or a metal similar to and/or formed integrally with contact portion 104 and/or base portion 106 of casing 102. The supports may prevent or reduce deformation of the contact portion 104, at least in a localized region at or near the support. The supports may contribute to or facilitate the imperceptible bending, flexing, travel or other motion of the contact portion 104 when subject to a typical input force.

In a non-limiting example shown in FIG. 2, the supports 212 may be positioned within compliant layer 208, between sense layer 204 and drive layer 206. In another non-limiting example as shown in FIG. 3, the supports 212 may be positioned within compliant layer 208 between contact portion 104 and back portion of casing 102 of electronic device 100.

As shown in FIGS. 2 and 3, stack-up of input surface 200 may also include a light guide layer 218 positioned between sense layer 204 and contact portion 104 of casing 102 of electronic device 100. Light guide layer 218 may be positioned between sense layer 204 and contact portion 104 to provide light to contact portion 104. In a non-limiting example shown in FIGS. 2 and 3, light guide layer 218 may be utilized to provide light to a set of micro-perforations or holes 220 formed or otherwise extending through contact portion 104 of electronic device 100. In some embodiments these holes are sealed with an optically clear sealant (or any other suitable sealant) to reduce ingress of debris and/or liquid, while allowing light to pass through holes 220. As discussed in more detail below with respect to FIG. 5, indicators (here holes 220) may be throughout input area 202, and may be utilized, along with light guide layer 218, to form, provide and/or display line boundaries for input surface 200. Some embodiments may employ indicators other than holes, for example: embedded illuminable structures (LEDs or other light sources, for example); color-changing strips, dots, or the like; micro displays, including LCD, OLED, and other types of displays; and so on. Any such indicator or set of indicators may be used in lieu of the holes described herein.

Although shown in a specific configuration in FIGS. 2 and 3, it is understood that the stack-up forming input surface 200 may be formed in different orders or orientations. In a non-limiting example, sense layer 204 and drive layer 206 may be flipped or switched within the stack-up. In another non-limiting example, light guide layer 218 may be positioned adjacent casing 102. In the non-limiting example where light guide layer 218 is positioned adjacent base casing 102, the remaining layers in the stack-up (for example, the compliant layer 208) may be formed from a material having substantially transparent properties and/or characteristics to allow light to pass through the stack-up of input surface 200.

Figure 4:
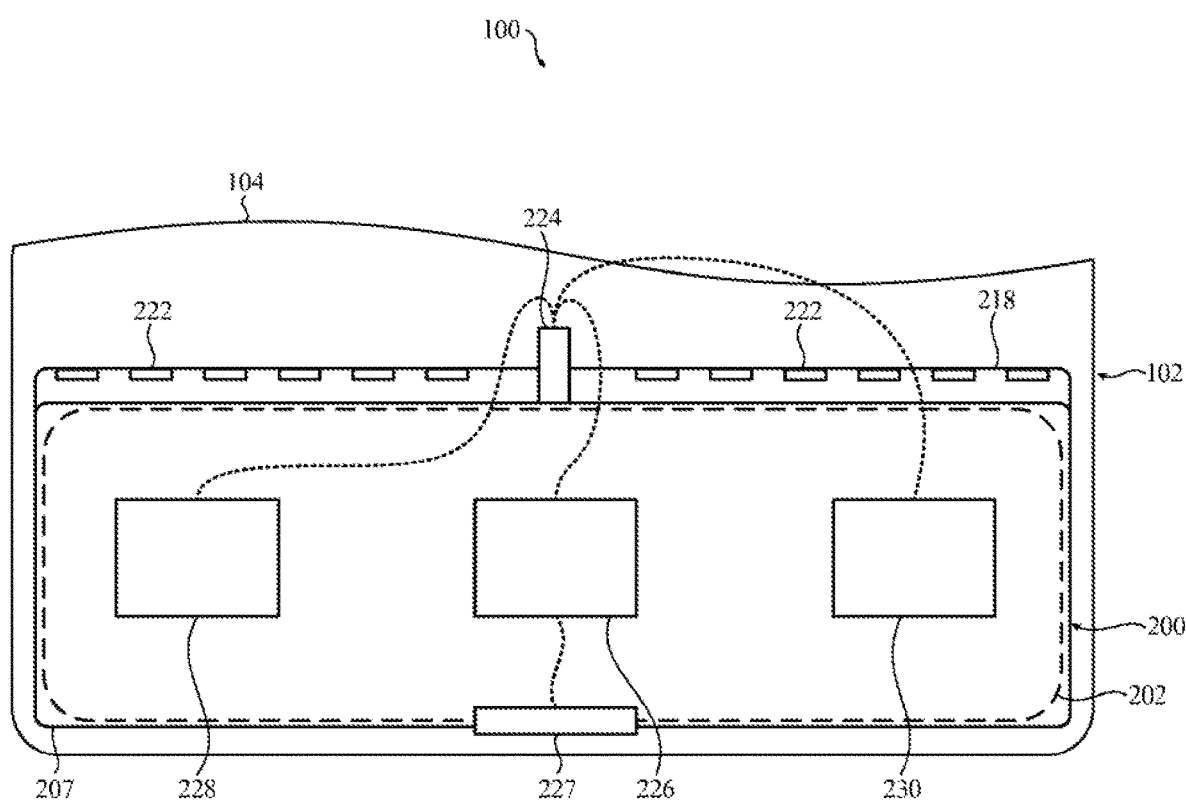
FIG. 4 shows a bottom view of a portion of an electronic device including a dynamic input surface, a haptic feedback module, a touch detection module and a touch frequency module, according to embodiments.

FIG. 4 shows a bottom view of portion of electronic device 100 and input surface 200. The back portion of casing 102 for electronic device 100 is removed in FIG. 4 to more clearly show input surface 200. As shown in FIG. 4, light guide layer 218 may extend beyond the other layers of stack-up of input surface 200, for example, rigid base layer 207. Further, one or more light source 222 may be positioned on, near, or adjacent light guide layer 218. Light source 222 may be any suitable light source, such as an LED, that may emit light into light guide layer 218, which may subsequently direct the light through holes 220 of contact portion 104 to light portions of input area 202, as discussed herein.

As shown in FIG. 4, stack-up of input surface 200 may also include a circuit connector 224 in electrical communication with various layers of input surface 200. Circuit connector 224 may be in electrical communication with sense layer 204 and drive layer 206 for detecting and/or determining a capacitance change in input surface 200 when a force is applied to contact portion 104 of electronic device 100. Circuit connector 224 may be configured as any suitable electrically communicative conduit or line including, but not limited to an electrical flex or an electrical trace.

Additionally, circuit connector 224 may be in electrical communication with various distinct components of electronic device 100. In a non-limiting example shown in FIG. 4, circuit connector 224 may be in electrical communication with a haptic feedback module 226 of electronic device 100. In the non-limiting example, circuit connector 224 may electrically couple haptic feedback module 226 to stack-up of input surface 200. As shown in FIG. 4, haptic feedback module 226 may be positioned on or aligned with stack-up forming input surface 200. Haptic feedback module 226 may also be in communication with haptic actuator(s) 227 (one shown) positioned at least partially within or adjacent to input area 202. The haptic feedback module 226, via haptic actuator(s) 227, may provide haptic signals to contact portion 104 of casing 102 including input area 202. As discussed herein, because there is no button for providing haptic feedback to a user of input surface 200, haptic feedback module 226 may recognize a user's input by communicating with stack-up of input surface 200, and may subsequently provide a haptic feedback through haptic signals (e.g., ultrasonic waves), generated by haptic actuator 227, to the user. The haptic signals mimic the tactile feel of a click on a conventional track pad.

Haptic feedback module 226 may provide additional haptic signal to contact portion 104 within input area 202 when a user is interacting with input surface 200, for example when used as a track pad. In a non-limiting example, haptic feedback module 226 may recognize when a user's touch is adjacent, proximate or on a boundary line of input area 202 for input surface 200, and may subsequently provide a haptic signals to notify the user that they may be moving outside of input area 202. This haptic signal may provide an indicator that may allow a user to interact within the boundaries of input area 202 of input surface 200 without having to look at input area 202 on contact portion 104.

In the non-limiting example shown in FIG. 4, circuit connector 224 may also be in electrical communication with a touch detection module 228. Similar to haptic feedback module 226, circuit connector 224 may electrically couple touch detection module 228 to stack-up of input surface 200. Touch detection module 228 may detect, determine and/or monitor the distinct types of touch and/or motions a user may perform on input area 202 of input surface 200, and may subsequently determine if the touch was intended to interact with input surface 200. In a non-limiting example, touch detection module 228 may detect a user touching input area 202 of input surface 200 with a single fingertip to form a contact point with input surface 200. Additionally, touch detection module 228 may also detect the contact point is continuously moving in a first direction. In the non-limiting example, touch detection module 228 may determine that the type of touch (e.g., single fingertip or single contact point) and/or motion of the touch (e.g., continuous in a first direction, or otherwise of a type determined to be deliberate) may correlate to a user intending to interact with input surface 200.

In another non-limiting example, touch detection module 228 may detect a user touching input area 202 of input surface 200, where a large portion of input area may be engaged and a large contact point or many contact points positioned close together may be detected. Additionally, touch detection module 228 may also detect the large contact point is randomly moving in a variety of directions, in small distances. In the non-limiting example, touch detection module 228 may determine that the type of touch (e.g., large contact point) and motion of the touch (e.g., random movement, small distances) may correlate to a user's palm touching input surface 200 while typing on keyboard assembly 106. As a result, touch detection module 228 may prevent interaction with input surface 200 until new or distinct touch-type and/or motion is detected.

Additionally, a location in which the change in capacitance occurs may indicate the location of the touch or force applied by the user. That is, embodiments described herein may localize a touch or force by determining which particular sense/drive regions are deformed by the touch or force. These deformed components correspond to a location at which the touch or force is applied because the change in capacitance is greatest at that region. Thus, embodiments described herein may sense not only touch or force but also a location at which a touch or force is applied.

Circuit connector 224 may also be in electrical communication with a touch frequency module 230. Similar to haptic feedback module 226, circuit connector 224 may electrically couple touch frequency module 230 to stack-up of input surface 200. Touch frequency module 230 may detect a portion of input area 202 in which the user most frequently touches and/or interacts with, and may subsequently resize and/or reposition input area 202 based on the detected, frequently touched area. In a non-limiting example, a user may frequently touch or interact with a right portion of input area 202 of input surface 200. As a result of detecting the frequency in which the right portion of the input area 202 is touched, touch frequency module 230 may resize and/or reposition input area 202 only on the right portion of input area 202.

Figure 5:
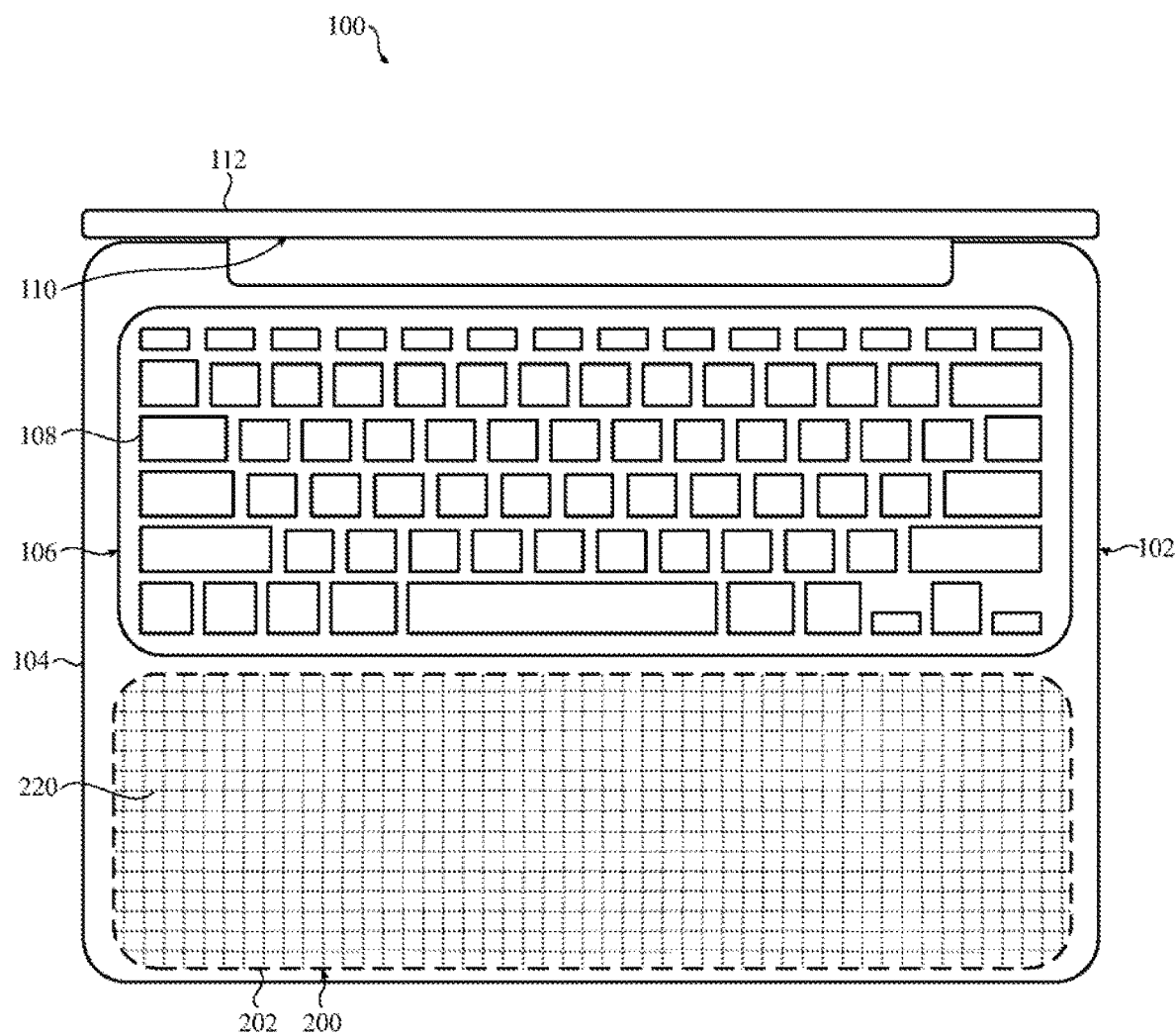
FIG. 5 shows a top view of an electronic device including a dynamic input surface and indicators formed in a contact portion, according to embodiments.

FIG. 5 shows a top view of electronic device 100 including input surface 200. As shown in FIG. 5 and discussed herein with respect to FIGS. 2 and 3, casing 102 may have micro-perforations or holes 220 (shown in phantom) formed or otherwise extending through contact portion 104. In the non-limiting example, holes 220 may be positioned through contact portion 104 in adjustable input area 202 for input surface 200. Input area 202 may include a group of holes 220. Additionally, and as discussed herein, input area 202, when configured, may have boundaries defined by illuminated holes 220. Although shown as being arranged in a grid geometry, it is understood that the holes 220 extending through contact portion 104 may be positioned in any geometry or configuration within contact portion 104. Additionally, it is understood that holes 220 may be formed over the entire surface of contact portion 104; however, only those holes 220 formed in input area 202 may be visible by a user when a light is provided by light guide layer 218 and/or light source 222, as discussed herein.

Figure 6A:
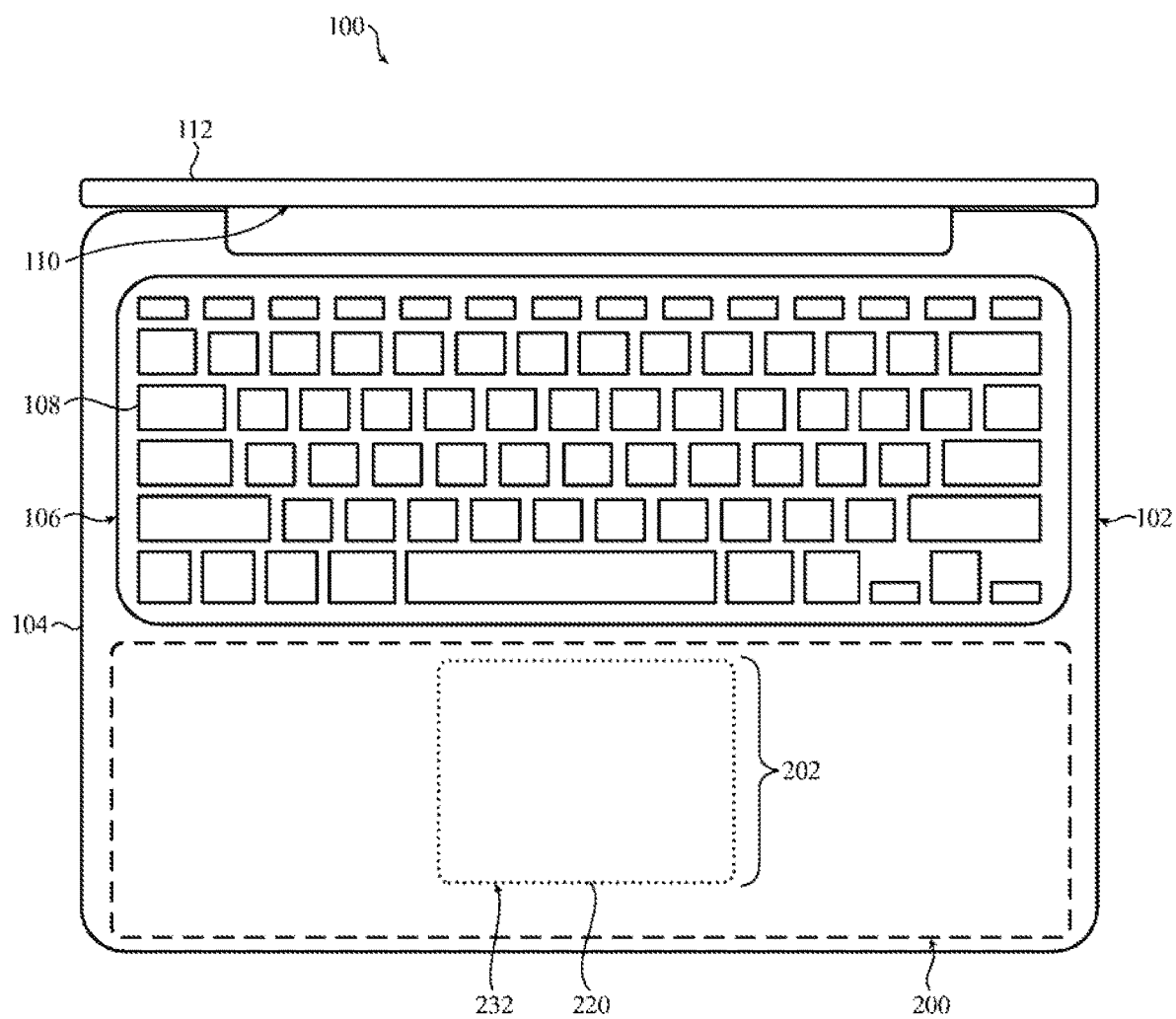
FIG. 6A shows a top view of an electronic device including a dynamic input surface, according to embodiments.

FIG. 6A shows a top view of electronic device 100 including input surface 200 (shown in phantom). In the non-limiting example shown in FIG. 6A, input area 202 may be defined by boundary lines 232. Boundary lines 232 may be formed by illuminating select holes 220 extending through contact portion 104 using light guide layer 218 and/or light source 222 (see, FIG. 4), or through the use of any other suitable indicators. To interact with input surface 200 and/or electronic device 100, a user must touch and/or form contact point(s) within input area 202 defined by boundary lines 232. Portions of input surface 200 positioned outside of input area 202 may be deactivated or temporarily inoperable, such that a user may not interact with input surface 200 when touching or forming contact point(s) outside of boundary lines 232. A user may perform a variety of touch gestures on contact portion 104 within input area 202 to interact or engage input surface 200 and/or electronic device 100. In non-limiting examples, a user may sweep their finger(s) to move a cursor on display 110, or a user may apply a force to deform contact portion 104 within input area 202 to provide a "mouse click" to input surface 200 and/or electronic device 100.

Figure 6B:
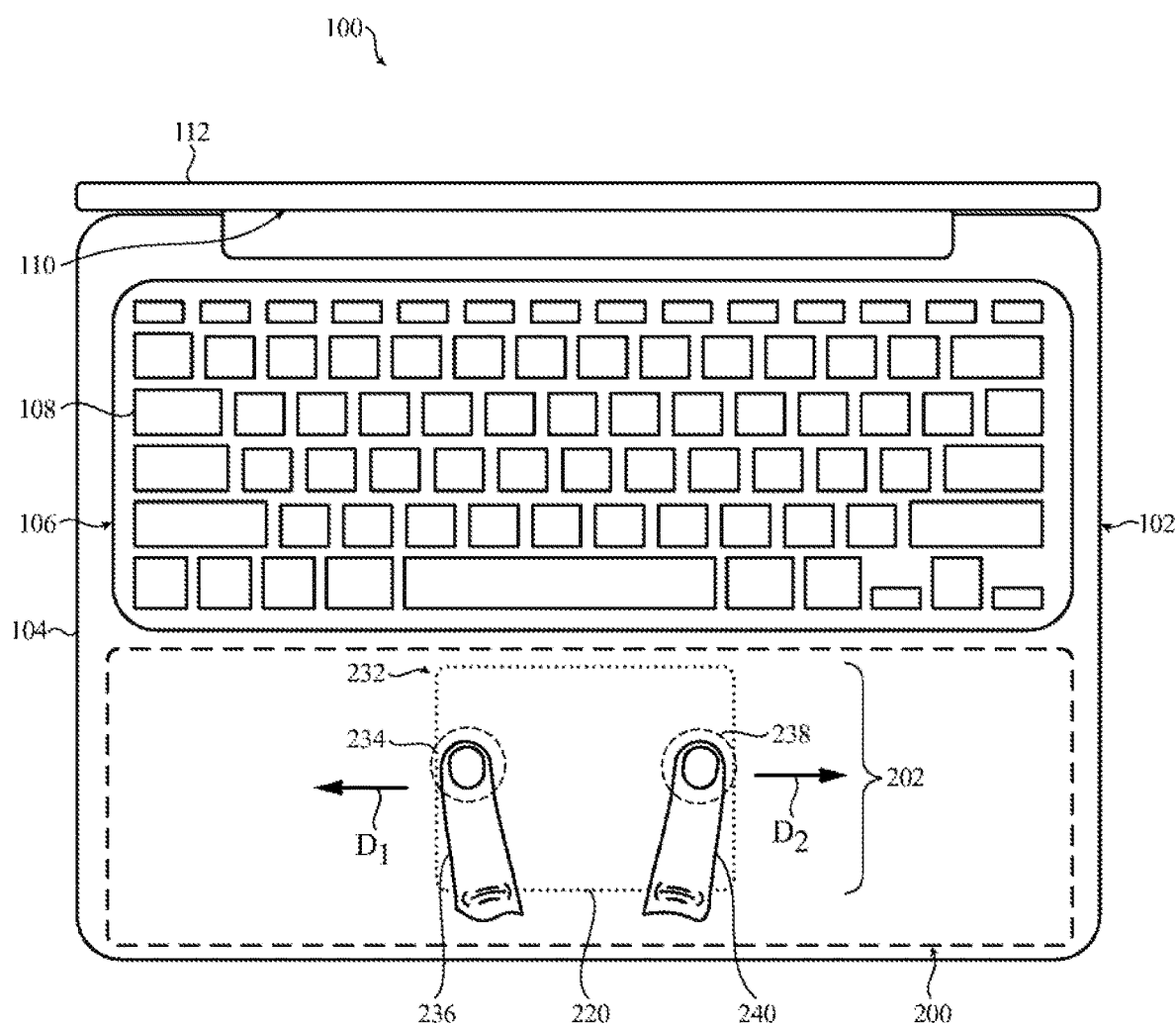
FIG. 6B shows a top view of the electronic device including the dynamic input surface as shown in FIG. 6A, according to embodiments. The electronic device is shown prior to resizing the dynamic input surface.

Additionally, a user may perform additional touch gestures to reconfigure input surface 200. In non-limiting examples shown in FIGS. 6B and 6C, a user may perform distinct touch gestures to adjust a size of input area 202 of input surface 200. In the non-limiting example shown in FIG. 6B, a user may form a first contact point 234 within input area 202 using a first finger 236, and may also form a second contact point 238 within input area 202 using a second finger 240. As shown in FIG. 6B, first contact point 234 formed by first finger 236 and second contact point 238 formed by second finger 240 may be positioned opposite one another within input area 202. Additionally, as shown in FIG. 6B, first contact point 234 formed by first finger 236 and second contact point 238 formed by second finger 240 may be positioned within input area 202 adjacent boundary lines 232.

Figure 6C:
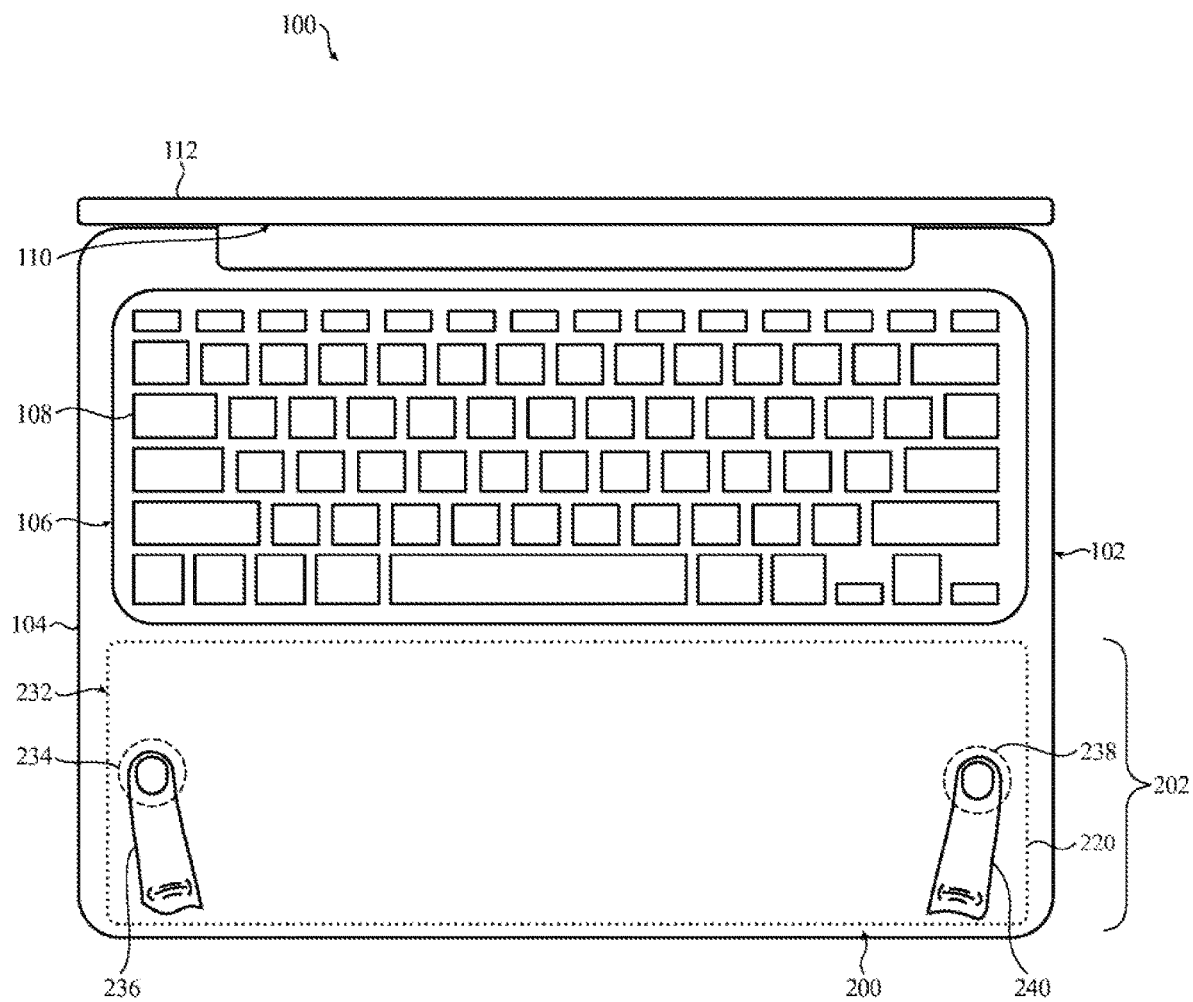
FIG. 6C shows a top view of the electronic device including the dynamic input surface as shown in FIG. 6A, according to embodiments. The electronic device is shown subsequent to resizing the dynamic input surface.

Once the first contact point 234 and second contact point 238 are formed, a user may move at least one contact point to either increase or decrease the dimensions of boundary lines 232 and/or input area 202 of input surface 200. In the non-limiting example as shown in FIGS. 6B and 6C, first contact point 234 and/or second contact point 238 may be moved outward to increase the dimensions of boundary lines 232 and/or input area 202 of input surface 200. As shown in FIG. 6B, first contact point 234 and/or first finger 236 may be moved in a first direction ($D_1$). While first contact point 234 and/or first finger 236 is moved in the first direction ($D_1$), second contact point 238 and/or second finger 240 may either remain stationary, or be moved in a second direction ($D_2$), opposite the first direction ($D_1$). Where the second contact point 238 and/or second finger 240 remains stationary, it may be subsequently moved when first contact point 234 and/or first finger 236 is moved to a desired position on contact portion 104 of electronic device 100.

As first contact point 234 and/or second contact point 238 move in the desired direction for resizing the dimensions of boundary lines 232 and/or input area 202 of input surface 200, input surface 200 may also change or alter the selectively illuminated holes 220 extending through contact portion 104. That is, resizing input area 202 by moving the first contact point 234 and/or second contact point 238 results in resizing boundary lines 232. The resizing of boundary lines 232 is accomplished by changing the holes 220 that are illuminated and/or in contact or alignment with the moving first contact point 234 and/or second contact point 238. This may allow a user to visualize in real time the size of input area 202 of input surface 200, as the dimensions of boundary lines 232 and/or input area 202 of input surface 200 are changing.

As shown in FIG. 6C, and with comparison to FIG. 6A, the dimensions of boundary lines 232 and/or input area 202 of input surface 200 may be resized to be larger. In the non-limiting example, after resizing, input area 202 may be formed on the majority of contact portion 104. This may allow a user more space or surface to interact with input surface 200 and/or electronic device 100.

The direction of movement of the contact points and/or fingers may determine the directional change and/or size increase of boundary lines 232 and/or input area 202 of input surface 200. In non-limiting examples, where a contact point is moved in a completely horizontal or vertical direction, the width or the height of boundary lines 232 and/or input area 202 of input surface 200 may only be resized. In a further non-limiting example, where a contact point is moved in both a horizontal and vertical direction (e.g., diagonally), both the width and the height of boundary lines 232 and/or input area 202 of input surface 200 may be resized.

Figure 7A:
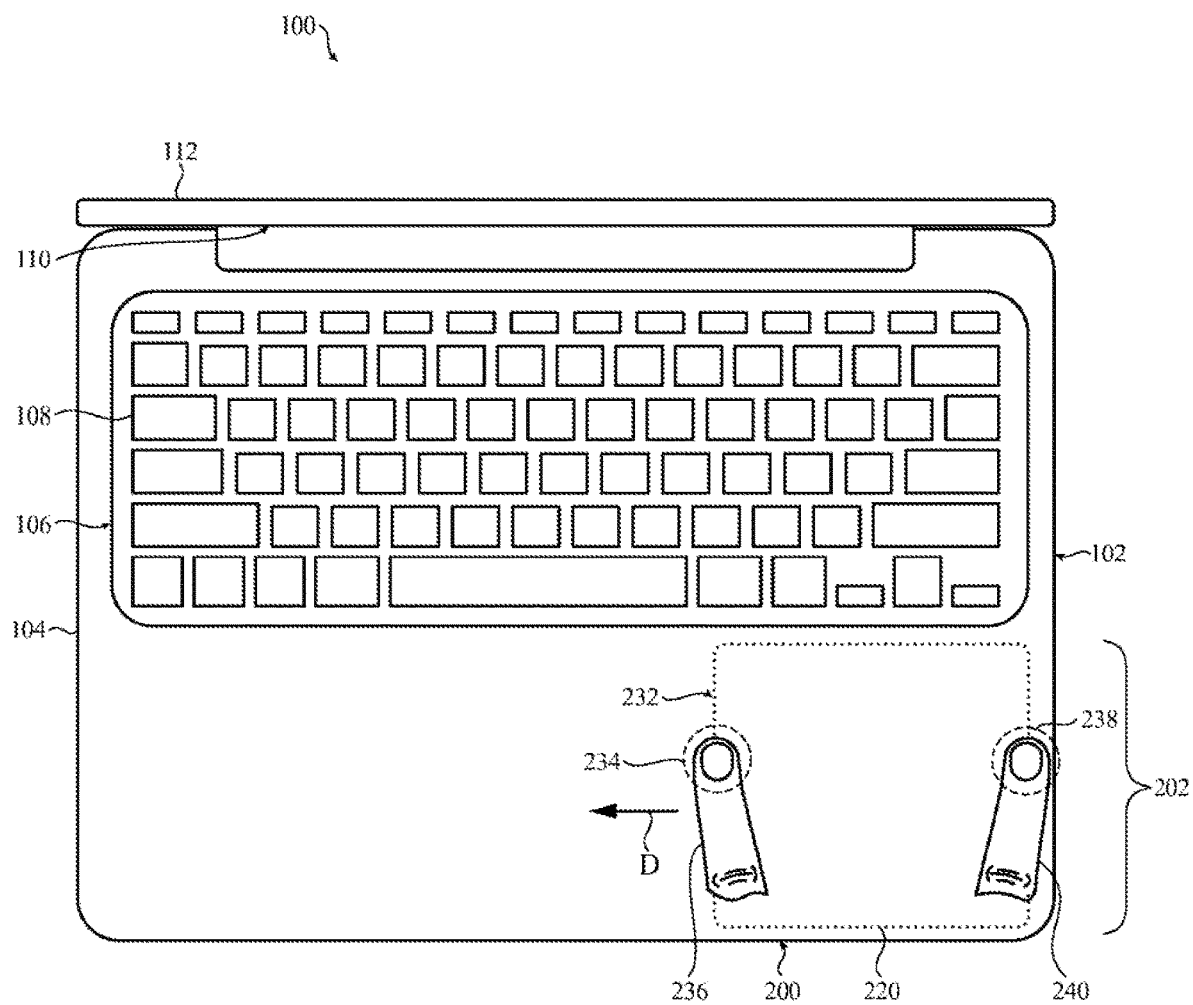
FIG. 7A shows a top view of an electronic device including a dynamic input surface prior to the dynamic input surface being repositioned in an input area, according to embodiments.
Figure 7B:
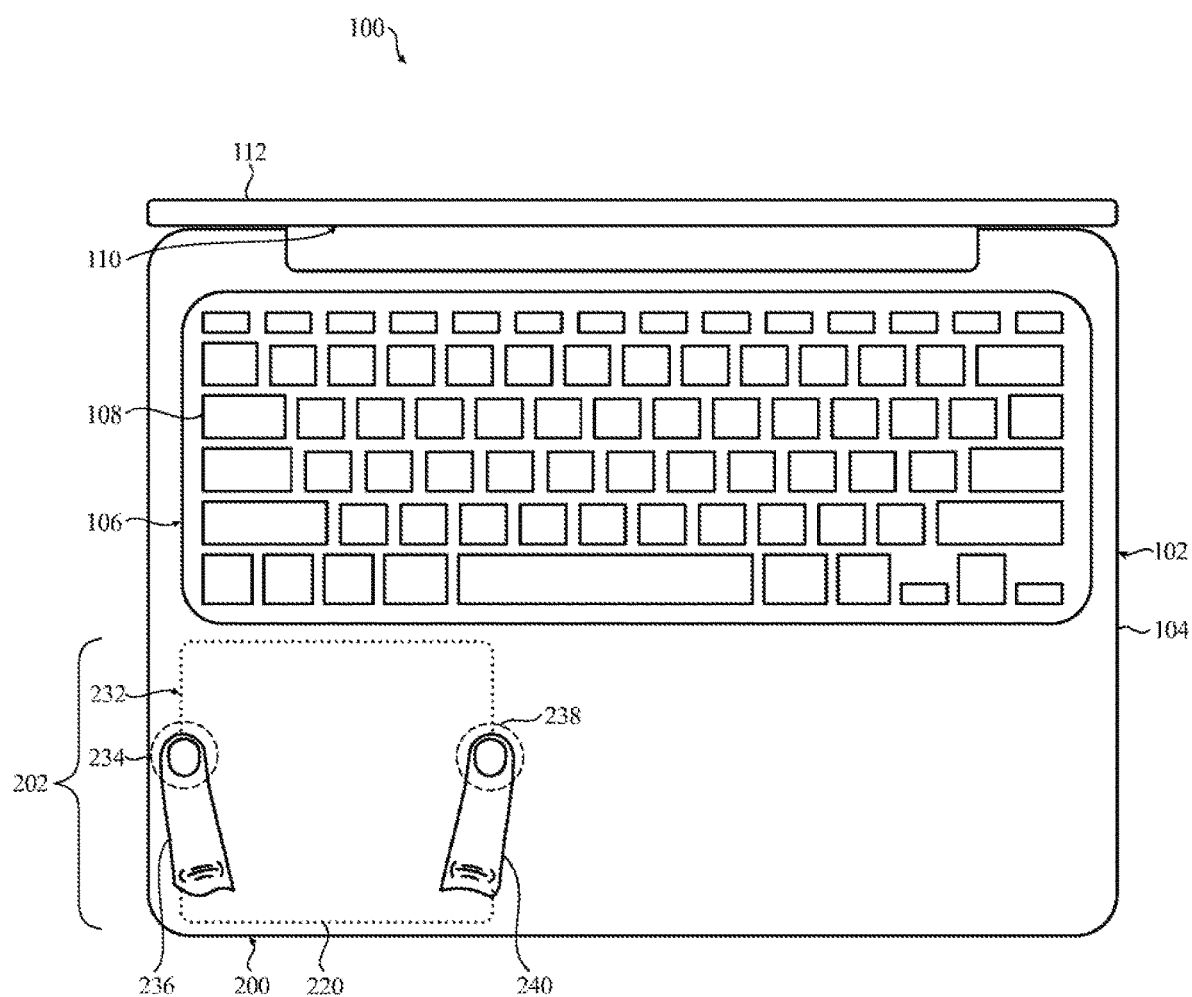
FIG. 7B shows a top view of the electronic device including the dynamic track of FIG. 7A, according to embodiments. The electronic device is shown subsequent to the dynamic input surface being repositioned in an input area.

FIGS. 7A and 7B show top views of electronic device 100 including input surface 200 (shown in phantom). In the non-limiting example shown in FIGS. 7A and 7B, boundary lines 232 and/or input area 202 of input surface 200 may be repositioned and/or relocated on contact portion 104 of electronic device 100. As shown in FIGS. 7A and 7B, first contact point 234 and second contact point 238 may be formed by first finger 236 and second finger 240, respectively, in a similar fashion as discussed herein with respect to FIGS. 6B and 6C. However, distinct from FIGS. 6B and 6C, first finger 236 and second finger 240 may be positioned directly on boundary line 232.

After first contact point 234 and second contact point 238 are formed, a user may move the first contact point 234 and the second contact point 238 simultaneously in a similar direction (D) to relocate or reposition input area 202 of input surface 200. In the non-limiting example as shown in FIGS. 7A and 7B, first contact point 234 and second contact point 238 may be simultaneously moved in a direction (D) to move input area 202 from a first position (see, FIG. 7A) on contact portion 104, to a second position (see, FIG. 7B) on contact portion 104. The first contact point 234 and second contact point 238 may be moved simultaneously by moving first finger 236 and second finger 240 in a direction (D) simultaneously. As similarly discussed herein with respect to FIGS. 6B and 6C, as first contact point 234 and second contact point 238 simultaneously move in direction (D), input surface 200 may also change the selectively illuminated holes 220 for others located in direction (D) from the initially-illuminated holes. Once positioned in the second position, as shown in FIG. 7B, the user may lift first finger 236 and second finger 240 to discontinue the contact points, and may touch and/or interact with relocated or repositioned input area 202 of input surface 200.

Although discussed herein as using two contact points (e.g., first contact point 234 and second contact point 238) and/or two fingers (e.g., first finger 236 and second finger 240), it is understood that any number of contact points and/or combination of fingers may be used to resize and/or reposition input area 202 of input surface 200. Additionally, it is understood that the contact points, and/or fingers may be positioned adjacent one another, and adjacent the same side of boundary line for resize and/or reposition input area 202 of input surface 200.

Figure 8A:
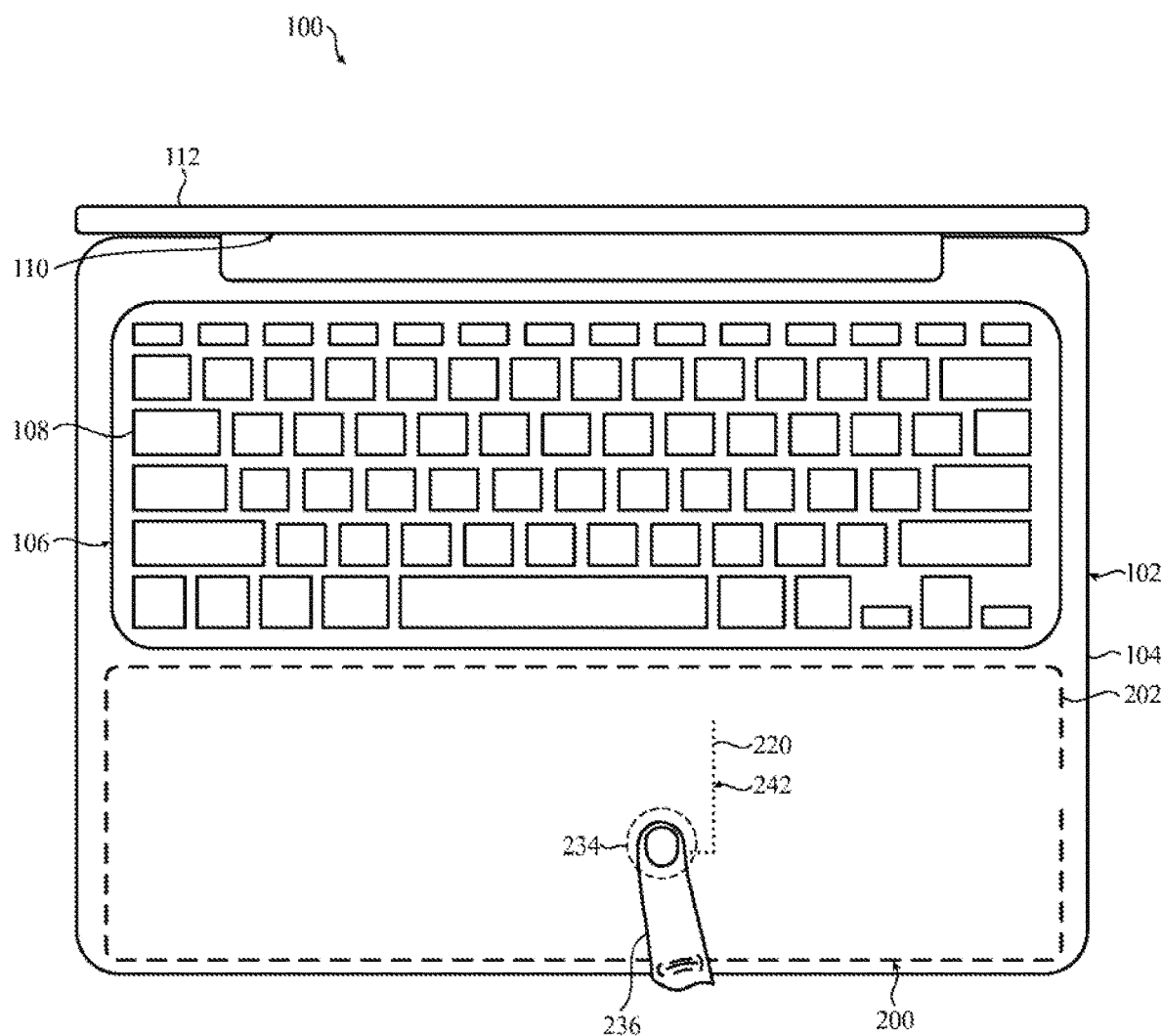
FIG. 8A shows a top view of an electronic device including a dynamic input surface and a light trail, and a user's finger positioned in a first position on the input surface, according to embodiments.
Figure 8B:
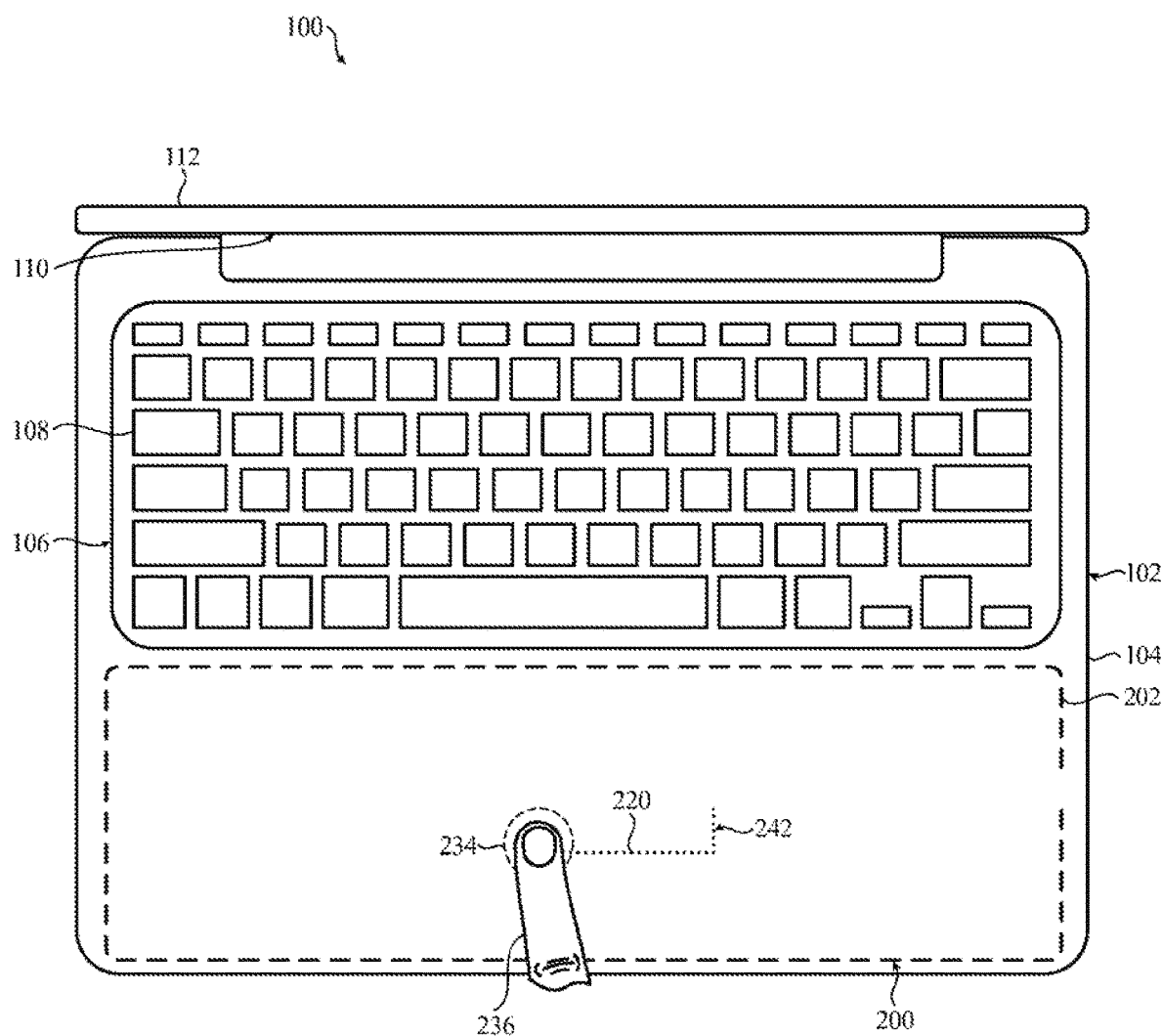
FIG. 8B shows a top view of the electronic device including the dynamic input surface and the light trail, and the user's finger positioned in a second position on the input surface, according to embodiments.
Figure 8C:
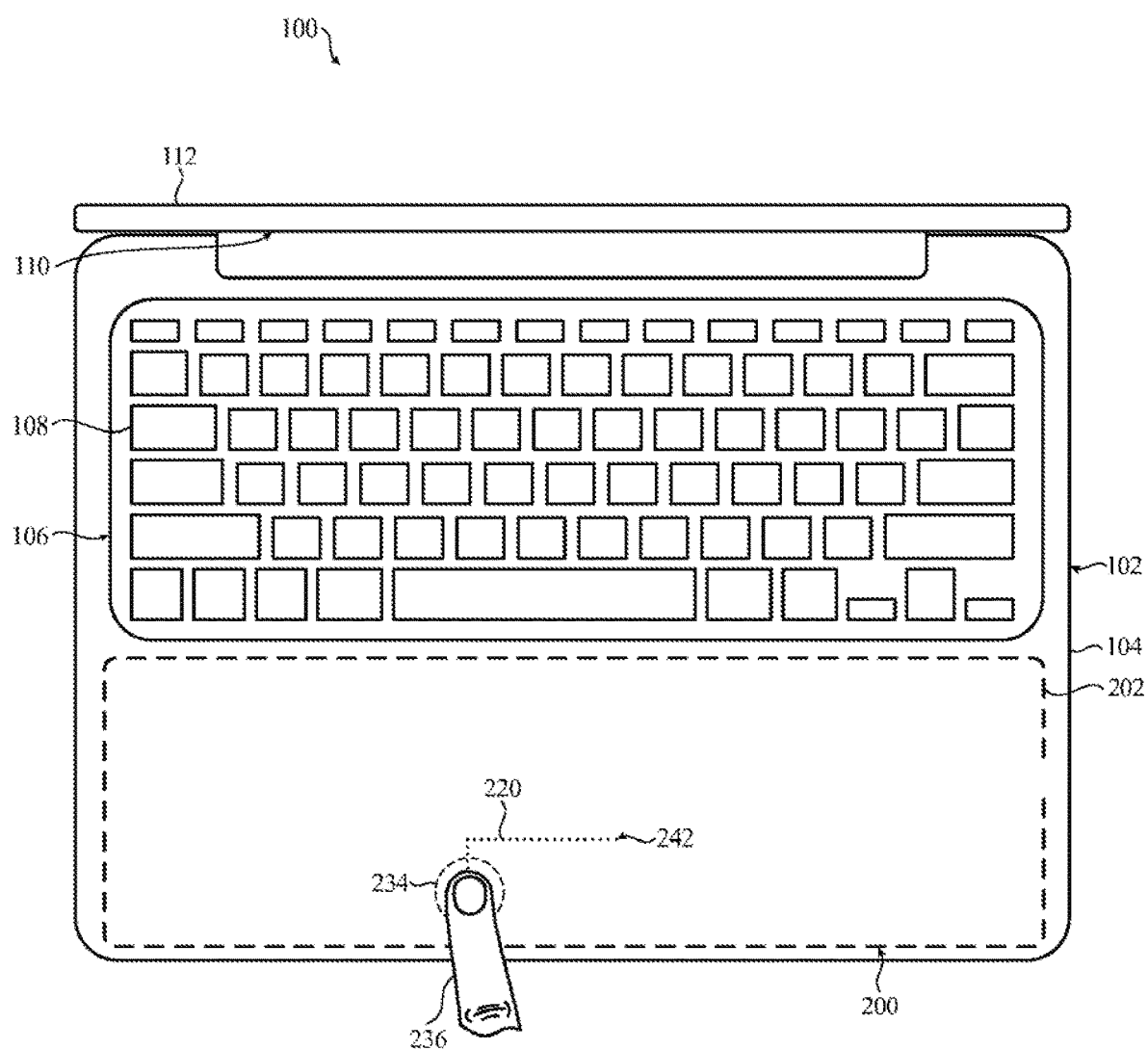
FIG. 8C shows a top view of the electronic device including the dynamic input surface and the light trail, and the user's finger positioned in a third position on the input surface, according to embodiments.

FIGS. 8A-8C show another non-limiting example of electronic device 100 having input surface 200. In the non-limiting examples shown in FIGS. 8A-8C, contact portion 104 may not include boundary lines 232 identifying input area 202. Rather, the entire area of contact portion 104 may be input area 202. In the non-limiting example, a user may contact or touch a contact portion 104 and/or input area 202 to form a contact point 234 with finger 236 in order to interact with input surface 200 and/or electronic device 100.

As shown in FIGS. 8A-8C, when a user's finger 236 moves along input area 202, input surface 200 may selectively illuminate holes 220 extending through contact portion 104 in portions in which a user previously touched. That is, as a user moves finger 236 along input area 202, input surface 200 may create a light trail 242 by illuminating holes 220 in areas of contact portion 104 in which a contact point 234 was previously made by finger 236. Light trail 242 may provide a user with a visual path of where the user's finger 236 previously touched on contact portion 104.

Figure 9:
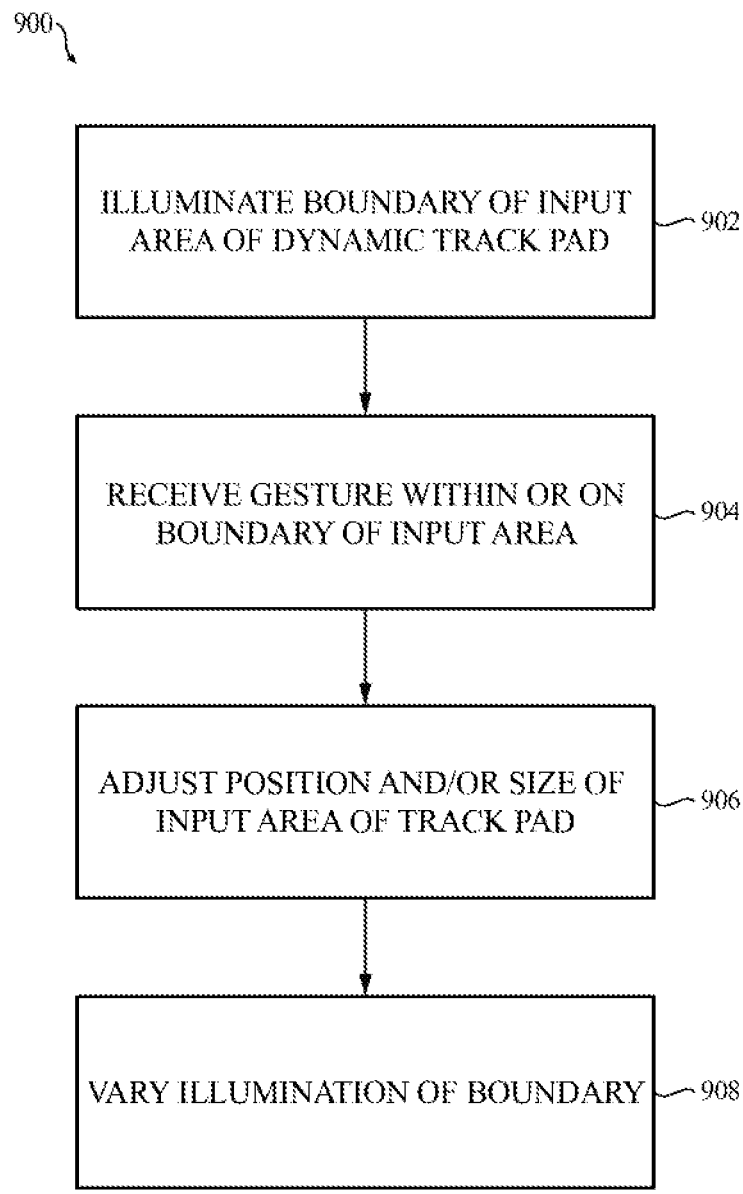
FIG. 9 depicts a flow chart illustrating a method for reconfiguring a dynamic input surface for an electronic device. The method may be performed on the components as shown in FIGS. 1-8C.

FIG. 9 depicts an example process for reconfiguring a dynamic input surface of an electronic device. Specifically, FIG. 9 is a flowchart depicting one example process 900 for adjusting a position and/or a size of a dynamic input surface for an electronic device, as discussed above with respect to FIGS. 1A-8C.

In operation 902, a boundary of an input area of a dynamic input surface is illuminated. The input area includes and/or is formed in a part of a contact surface. The contact surface may be illuminated to visually indicate the input area of the dynamic input surface. The contact surface may be part of a partially-flexible contact portion of an electronic device. The illuminating of the boundary of the input area may also include providing light to a group of holes extending through the partially-flexible, metal contact portion defining the dynamic input surface, and forming the boundary of the input area by lighting the group of holes.

In operation 904, one or more gestures may be received within or on the boundary of the input area of the dynamic input surface. The receiving of the gesture(s) may include receiving a first contact point within or on the boundary of the input area, and receiving a second contact point within or on the boundary of the input area. The first contact point and the second contact point are on opposite and/or adjacent sides of the input area.

In operation 906, the position and/or the size of the input area of the dynamic input surface may be adjusted. The input area may be adjusted based on the gesture(s) received in operation 904. The adjusting of the position of the input area may include simultaneously moving a first portion of the boundary corresponding to the first contact point and a second portion of the boundary corresponding to the second contact point in a similar or same direction across the contact surface. Additionally, the adjusting of the position of the input area may include relocating the input area from a first position on the contact surface to a second position on the contact surface.

The adjusting of the size of the input area may include one of increasing or decreasing at least one dimension of the boundary forming the input area of the dynamic input surface. Additionally, the adjusting of the size of the input area may include moving the first portion of the boundary corresponding to the first contact point in a first direction and, one of, maintaining the second portion of the boundary corresponding to the second contact point in a stationary position, or moving the second portion of the boundary corresponding to the second contact point in a second direction, opposite the first direction.

In operation 908, the illumination of the boundary is varied. The illumination of the boundary is varied according and/or based on the gesture received in operation 904. Where the received gesture is one of repositioning the input area of the dynamic input surface, the illumination of the boundary is varied to move the input area defined within the boundary is moved to the new, desired position on the contact surface. Where the received gesture is one of resizing the input area of the dynamic input surface, the illumination of the boundary is varied to increase or decrease the input area defined within the boundary to the new, desired size.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A laptop computer comprising:
an upper portion comprising:
   a display case; and
   a display enclosed by the display case; and
a lower portion coupled to the upper portion and comprising:
   a keyboard;
   a casing at least partially enclosing the keyboard and having an outer layer that defines an exterior surface of the lower portion positioned along a side of the keyboard;
   a light source positioned below the outer layer of the casing and configured to produce an illuminated boundary of a track pad region; and
   a force sensor positioned below the outer layer of the casing and configured to detect an input within the track pad region, wherein the laptop computer is configured to:
      detect a gesture input along the exterior surface of the lower portion;
      dynamically vary at least one of a position or a size of the track pad region in accordance with the gesture input; and
      while dynamically varying the at least one of the position or the size of the track pad region, animate the illuminated boundary to display the dynamic variation of the at least one of the position or the size of the track pad region.

2. The laptop computer of claim 1, wherein:
the gesture input includes a first finger contact positioned at a first corner of the illuminated boundary and a second finger contact positioned at a second corner of the illuminated boundary; and
a size of the illuminated boundary is increased in accordance with an increase in distance between the first finger contact and the second finger contact.

3. The laptop computer of claim 2, wherein the size of the illuminated boundary is reduced in accordance with a decrease in distance between the first finger contact and the second finger contact.

4. The laptop computer of claim 1, wherein:
the gesture input includes a first finger contact and a second finger contact; and
a location of the illuminated boundary is modified in accordance with a movement of the first finger contact and the second finger contact in a same direction.

5. The laptop computer of claim 1, wherein:
the outer layer is formed from a metal material;
the metal material defines an array of holes; and
the illuminated boundary is produced by emitting light through a subset of holes of the array of holes.

6. The laptop computer of claim 1, wherein:
the input causes a localized deformation of the outer layer of the casing; and
the force sensor is configured to detect the localized deformation by detecting a change in capacitance.

7. The laptop computer of claim 1, wherein the force sensor comprises:
a drive layer positioned below the outer layer of the casing;
a sense layer positioned below the outer layer of the casing; and
a compliant layer positioned between the drive layer and the sense layer.

8. The laptop computer of claim 7, wherein the compliant layer comprises an array of gel dots positioned between the drive layer and the sense layer.

9. The laptop computer of claim 1, further comprising a haptic actuator configured to produce haptic feedback in response to the input received within the track pad region.

10. The laptop computer of claim 1, wherein the light source comprises a liquid crystal display (LCD), an organic light emitting display (OLED), or an array of light-emitting diodes (LEDs).

11. An electronic device comprising:
a display case housing a display;
a keyboard assembly;
a casing at least partially surrounding the keyboard assembly and defining an input area, the input area adjacent to the keyboard assembly and along an exterior surface of the casing;
a sensor positioned within the casing and configured to detect a location and an amount of force of a contact along the input area; and
a light source configured to produce an illuminated boundary along the input area, wherein the electronic device is configured to:
   detect a gesture input within the input area along the exterior surface;
   in accordance with the gesture input, dynamically vary at least one of a position or a size of a track pad region in the input area; and
   while dynamically varying the at least one of the position or the size of the track pad region, animate the illuminated boundary to display the dynamic variation of the track pad region.

12. The electronic device of claim 11, wherein the gesture input includes a first contact that is stationary and a second contact that is moving relative to the first contact.

13. The electronic device of claim 12, wherein a size of the illuminated boundary is changed in accordance with a distance between the first contact and the second contact.

14. The electronic device of claim 11, wherein the light source is further configured to produce a visual path that corresponds to a path of the contact along the input area.

15. The electronic device of claim 11, wherein the input area extends to an edge of the casing.

16. The electronic device of claim 11, wherein:
the sensor comprises:
   a drive layer positioned within the casing; and
   a sense layer positioned within the casing; and
the sensor detects the location and the amount of force of the contact using a change in capacitance between the drive layer and the sense layer.

17. A computing device comprising:
an upper portion comprising a display; and
a lower portion coupled to the upper portion and comprising:
   a casing defining an exterior surface of the lower portion;
   a keyboard assembly positioned at least partially within the casing;
   a sensor positioned within the casing and configured to detect a contact along the exterior surface; and a light source positioned within the casing and configured to display an illuminated boundary of a dynamic input region, wherein the computing device is configured to:
  detect a gesture input along the exterior surface;
  dynamically vary at least one of a position or a size of the dynamic input region in accordance with the gesture input; and
  while dynamically varying the at least one of the position or the size of the dynamic input region, animate the illuminated boundary to display dynamic variation in accordance with the dynamic variation of the at least one of the position or the size of the dynamic input region.

18. The computing device of claim 17, wherein:
the gesture input comprises a first contact and a second contact; and
a size of the illuminated boundary increases in accordance with an increase in distance between the first contact and the second contact.

19. The computing device of claim 18, wherein the size of the illuminated boundary decreases in accordance with a decrease in distance between the first contact and the second contact.

20. The computing device of claim 17, wherein:
the gesture input comprises a first contact and a second contact; and
a location of the illuminated boundary changes in accordance with a simultaneous movement of the first contact and the second contact.

\* \* \* \* \*